(12) United States Patent
Azenko et al.

(10) Patent No.: US 7,751,338 B2
(45) Date of Patent: *Jul. 6, 2010

(54) ESTABLISHMENT OF MULTIPLE UPSTREAM DOCSIS LOGICAL CHANNELS BASED UPON PERFORMANCE

(75) Inventors: Yehuda Azenko, San Jose, CA (US); Selim Shlomo Rakib, Cupertino, CA (US)

(73) Assignee: Terayon Communication Systems, Inc., Santa Clara, CA (US)

(*) Notice: Subject to any disclaimer, the term of this patent is extended or adjusted under 35 U.S.C. 154(b) by 1460 days.

This patent is subject to a terminal disclaimer.

(21) Appl. No.: 10/729,179

(22) Filed: Dec. 6, 2003

(65) Prior Publication Data

US 2005/0122996 A1 Jun. 9, 2005

(51) Int. Cl.
*G01R 31/08* (2006.01)
*H04J 3/26* (2006.01)
*H04J 3/16* (2006.01)
*H04N 7/173* (2006.01)

(52) U.S. Cl. .................. 370/252; 370/432; 370/437; 725/116; 725/120

(58) Field of Classification Search ............. 370/252, 370/432, 437, 465; 725/116, 120
See application file for complete search history.

(56) References Cited

U.S. PATENT DOCUMENTS

| 6,385,773 | B1* | 5/2002 | Schwartzman et al. | 725/124 |
| 6,459,703 | B1* | 10/2002 | Grimwood et al. | 370/442 |
| 6,898,755 | B1* | 5/2005 | Hou | 714/784 |
| 7,088,733 | B1* | 8/2006 | Rowe | 370/437 |
| 7,139,283 | B2* | 11/2006 | Quigley et al. | 370/432 |
| 7,315,967 | B2* | 1/2008 | Azenko et al. | 714/704 |
| 7,359,332 | B2* | 4/2008 | Kolze et al. | 370/252 |
| 7,379,469 | B2* | 5/2008 | Hollums et al. | 370/419 |
| 2004/0008683 | A1* | 1/2004 | Cloonan et al. | 370/395.4 |
| 2005/0078699 | A1* | 4/2005 | Cummings | 370/437 |

\* cited by examiner

*Primary Examiner*—Nittaya Juntima

(57) ABSTRACT

A process for grouping cable modems by type/modulation profile and/or throughput ability into different logical groups. Each logical group is commanded to transmit on an upstream which has a burst profile set to effectively use the throughput ability of the cable modem. Some species monitor initial ranging bursts and separate CMs with inadequate power onto a lower throughput upstream. Some species monitor post registration data transmissions for various factors and subdivide groups into subgroups of overperformers and underperformers.

8 Claims, 13 Drawing Sheets

PROCESS TO GROUP AND SUBGROUP MODEMS BY MODEM TYPE, SNR AND/OR RECEIVED POWER AND COMMAND EACH TO SEND UPSTREAM DATA ON AN UPSTREAM CHANNEL HAVING SUITABLE BURST PROFILE CHARACTERISTICS MATCHED TO THE MODEM'S THROUGHPUT AND RECEIVED POWER AND/OR SNR

ESTABLISHMENT OF MULTIPLE UPSTREAM DOCSIS LOGICAL CHANNELS BASED UPON PERFORMANCE

BACKGROUND OF THE INVENTION

Prior art cable modem termination systems (CMTS) in DOCSIS systems establish upstream burst profiles, one for each DOCSIS upstream. The burst profile for each upstream controls the data throughput rate and other burst parameters that all cable modems transmitting on that upstream must use. The burst profile must be set to the lowest common denominator such that the least capable cable modem (CM) on the system can comply with it. Typical systems have hundreds or thousands of cable modems, some of which may be legacy CMs or CMs purchased by customers that are not capable of high throughput. This penalizes all CMs on the system to transmit at a lower throughput than they are capable of if even one CM on the same upstream is not capable of transmitting at high throughput. This results in a lower average throughput on the channel. In other words, in order to ensure that the worst CM has a robust burst profile with adequate error correction protection, the whole channel is forced to operate at a lower throughput. Therefore, the upstream throughput of all CMs on the upstream will be penalized because of the inadequacy of a small number of CMs.

Therefore, what is needed is a way to get higher average throughput by using different upstream logical channels, each with its own burst profile. A way is needed of segregating the CMs in the system into groups based upon throughput capability, each group suitable for transmission on one of the upstream logical channels having a matching burst profile. A way is needed to segregate CMs with high throughput capability onto a logical channel with a less robust burst profile but higher throughput. A way is needed to segregate lesser CMs onto a logical channel with a more robust burst profile yielding higher protection at the expense of lower throughput.

SUMMARY OF THE INVENTION

The genus of the invention is defined by any process which:
1) divides cable modems (CM) up into logical groups based upon either the cable modem's DOCSIS type/modulation profile (DOCSIS 1.0, DOCSIS 1.1, DOCSIS 2.0 ATDMA and DOCSIS 2.0 SCDMA) and/or based upon throughput ability as measured by performance characteristics;
2) creates a separate upstream logical channel for each logical group, each upstream logical channel having a burst profile tailored to the type and/or throughput ability of the cable modems in the associated logical group; and
3) sends downstream messages to the cable modems to cause them to switch to an upstream logical channel having a burst profile tailored to the logical group to which the cable modem belongs.

Numerous species are within this genus. Several of the most important species are defined below. DOCSIS only recognizes four different types of upstreams: DOCSIS 1.x that supports no DOCSIS 2.0 TDMA features; mixed mode upstreams which support DOCSIS 1.x and DOCSIS 2.0 TDMA bursts during different time intervals; DOCSIS 2.0 advanced time division multiplexing (ATDMA) only; and DOCSIS 2.0 synchronous code division multiplexing (SCDMA) only. It is the CMTS that decides which modulation profile a CM operates in, but DOCSIS 1.0 and 1.1 compatible CMs cannot be ordered to operate in any 2.0 mode. The invention creates multiple logical groups based upon type/modulation profile or throughput ability or both, and creates an upstreams for each logical group, each upstream having a burst profile tailored to the modem types/burst profile in the logical group and/or the throughput ability of the modems in the group. In some species, type/burst profile alone is used for the grouping. In other species, throughput ability alone (within 1.x and 2.0 groups with no distinction between 1.0 and 1.x and ATDMA and SCDMA) is used to do the grouping, and in other species, grouping is first done on modem type/modulation profile (hereafter simply referred to as type) and then subgrouping within each group is done based upon throughput ability. In other species, grouping is first done on type with monitoring of SNR and/or received power during initial training and subgrouping of CMs with power shortfall or bad SNR to lower power, more robust channels so that registration can be accomplished successfully. After registration is accomplished in this species, the modem types are learned and the modems are divided by type into separate logical groups, each with its own logical channel. In still other species, after the initial training and grouping into low power channels for some CMs and after registration and grouping by type/modulation profile, monitoring of data transmissions for communications quality is done on each group, and any CMs who are performing too well or too poorly for their upstream channels are moved to different channels having burst profiles tailored to the CM's throughput ability.

The details of several of the most important species follow.

1) One species divides CMs up into logical groups strictly by DOCSIS type. This species separates DOCSIS 1.0 and 1.1 CMs into separate logical groups and divides DOCSIS 2.0 modems up into two logical groups, one operating in advanced time division multiplexing (ATDMA) and one operating synchronous code division multiplexing (SCDMA). Each logical group of 2.0 modems operates on a different physical upstream channel or on a different logical channel on the same physical upstream channel. A physical upstream channel is an upstream carrier modulated with digital data. A logical upstream channel can be a time interval on a physical upstream channel. Thus, all ATDMA 2.0 CMs can transmit during different timeslots during a time interval devoted to logical group 1 on the physical upstream channel, and all SCDMA CMs can transmit during a second interval devoted to 2.0 SCDMA bursts on the same physical upstream channel. In this species, no monitoring of other criteria like received power or signal to noise ratio is done. Modem types are learned by DOCSIS registration messages. Generally, the 2.0 CMs will use either SCDMA or ATDMA. In most cases, the CMTS will not open two separate logical channels for ATDMA and SCDMA.

2) Another species divides CMs up into logical groups strictly by DOCSIS type and, optionally, separates DOCSIS 1.0 and 1.1 CMs into separate logical groups and optionally divides DOCSIS 2.0 modems up into two logical groups, one operating in advanced time division multiplexing (ATDMA) and synchronous code division multiplexing (SCDMA). Each different type CM transmits upstream on a different logical and/or physical channel. Then the modems in each group are monitored for communications link quality as measured by any one or more of the following factors: signal-to-noise ratio (SNR), received signal power, bit error rate, byte error rate, Reed-Solomon codeword error rate, and packet error rate. CMs with one or more of the link quality factors indicating the CM is operating too well or too poorly for its upstream channel are then moved to an upstream channel or logical channel having a burst profile (throughput and various forward error correction factors) tailored to allow communication with an acceptable error rate. Hereafter physical upstream channels and logical upstream channels will simply be referred to as upstream channels since either will suffice to segregate different performance level modems. Generally, the 2.0 CMs will use either SCDMA or ATDMA. In most cases, the CMTS will not open two separate logical channels for ATDMA and SCDMA.

3) Another species divides CMs up into logical groups strictly by DOCSIS type with DOCSIS 1.0 and 1.1 CMs grouped in the same logical groups and DOCSIS 2.0 modems grouped in the same logical group. Then the modems in each group are monitored for communications link quality as measured by any one or more of the following factors: signal-to-noise ratio (SNR), received signal power, bit error rate, byte error rate, Reed-Solomon codeword error rate, and packet error rate. CMs with one or more of the link quality factors indicating the CM is operating too well or too poorly for its upstream channel are then moved to an upstream channel having a burst profile (symbol rate, modulation type and various forward error correction factors) tailored to allow communication with an acceptable error rate.

4) Another species divides CMs up into logical groups strictly by DOCSIS type with DOCSIS 1.0 and 1.1 CMs grouped in different logical groups on different upstream channels carried on different physical channels, or on different logical channels, each logical channel comprising a different time region of a DOCSIS 1.x mixed mode channel, each separate logical channel having a burst profile tailored for DOCSIS 1.0 or 1.1 (or 1.0 and 1.1 CMs can be grouped together inot one logical channel of DOCSIS 1.x). Likewise, DOCSIS 2.0 modems in ATDMA would be grouped together and assigned to a DOCSIS 2.0 ATDMA upstream channel, and DOCSIS 2.0 SCDMA modems would be grouped in the same logical group and assigned to an upstream logical channel having a burst profile tailored to the modem type. During initial training or ranging of each modem, the CMTS calculates SNR and/or monitors the received power. If after the maximum number of attempts to correct inadequate received power or inadequate SNR, acceptable received power or SNR is not achieved, the CMTS moves the CMs with problems to a lower throughput, more robust upstream channel so that effective communications for registration purposes can be achieved with each CM. Likewise, CMs that are overperforming their logical channels are moved to a higher throughput upstream channel having a higher symbol rate, more complex modulation or less forward error correction.

5) The same as any of the species defined above but including post-registration monitoring. In this species, the DOCSIS 2.0 CMs which do not have a power shortfall problem or bad SNR such as to be segregated during initial training into lower throughput, more robust channels are all grouped into a single logical group operating into SCDMA or ATDMA after registration. Subsequent monitoring may cause the CMTS to conclude that certain CMs need to have their burst profiles changed to handle changing conditions such as falling SNR, burst noise, impulse noise etc. The CMTS will then create a new physical upstream channel or a new upstream logical channel (hereafter new upstream channel) with an appropriate burst profile and send downstream message(s) to a CM to be changed to the new upstream channel telling it which new burst profile to assume and ordering it to change to the new upstream channel. Specifically, after registration, the modems in each logical group are monitored for communications link quality as measured by any one or more of the following factors: signal-to-noise ratio (SNR), received signal power, bit error rate, byte error rate, Reed-Solomon codeword error rate, and packet error rate. CMs with one or more of the link quality factors indicating the CM is operating too well or too poorly for its upstream channel are then moved to an upstream channel having a burst profile (throughput and various forward error correction factors) tailored to allow communication with an acceptable error rate. If an upstream channel does not already exist having the needed burst profile and linked to the appropriate downstream to which a CM is listening, then an upstream with the appropriate burst profile will be created. As many different burst profile upstreams as are necessary are created. There are many factors which can be changed in a burst profile. The logical channel parameters include: a) the symbol rate which can be any one of 6 different rates from 160 ksym/sec to 5.12 Msym/sec in octave steps; b) the center frequency; and c) the 1536-bit preamble superstring that is prepended to at least some bursts; and d) the SCDMA channel parameters. The burst profile transmission characteristics of a logical channel, in the preferred embodiment, include: modulation (QPSK, 64 QAM, 128 QAM etc.), differential encoding on or off; Trellis or TCM encoding on or off; preamble length, preamble value offset; preamble type (QPSK 0 or QPSK1), RS (Reed-Solomon) error correction T value from 0 to 16 where 0 is no FEC bits to 16 for the maximum where the number of codeword parity bytes is 2xT, RS codeword information bytes length (16 to 253), scrambler seed, max burst length in minislots, guardtime from 5 to 255 symbols for TDMA channels and 1 symbol for SCDMA channels, last codeword (fixed or shortened), scrambler on or off, byte interleaver depth, byte interleaver block size, SCDMA spreading on or off, codes per subframe, and SCDMA interleaver step size. User unique parameters may vary from user to user even when on the same channel and same burst type and include such things as: power level; offset frequency (defines center frequency of channel to transmit on); ranging offset to achieve minislot boundary alignment at CMTS (which also achieves upstream chip clock alignment between the upstream chip clock generated at the CMTS and the chip clock embedded in the received signal at the CMTS receiver—a state which is referred to herein as "phase coherence"), burst length in minislots if variable on the specified channel (changes from burst to burst); and the transmit equalizer coefficients (up to 64 coefficients specified by 4 bytes per coefficient—2 real and 2 complex). The CMTS can create many different upstreams by varying the values for these logical channel parameters and burst profile transmission characteristics. The CMTS will vary these burst profile characteristics based upon the results of monitoring data transmissions of each CM after registration and the initial grouping of a CM into a logical group in a preferred species.

In species 1, the CMTS receives upstream data such as DOCSIS registration messages from cable modems in a system and divides them up into logical groups based upon modem type or throughput ability. In this embodiment, all DOCSIS 1.0 and 1.1 CMs are classified as different types and all DOCSIS 1.0 modems ordered by the CMTS to operate in a 1.0 burst profile, and all DOCSIS 1.1 modems ordered by the CMTS to operate in a 1.1 burst profile, and all DOCSIS 2.0 CMs are ordered to operate in SCDMA or ATDMA mode and grouped into a single group. The process then creates a separate upstream channel for each logical group of modems, each upstream having transmission characteristics optimized for the modem type in the group assigned to it. The process then assigns each modem to the upstream having characteristics optimized for that type of modem.

DOCSIS compatible CMTS can create upstream channels for each logical group of CMs and control their initial training by sending Upstream Channel Descriptor and MAP messages to all cable modems listening to a downstream. The CMTS controls which CMs are assigned to each upstream channel by sending DOCSIS channel change messages or ranging response messages to CMs that need to change their upstream channel. These channel change messages are used to assign each DOCSIS compatible cable modem to an upstream channel having a burst profile optimized for the modem type and mode of transmission for the modems in the group. The same receiver can process all logical channels where each logical channel is during a different time interval of the same upstream physical channel.

In the preferred embodiment, subgroupings within each logical group are made both initially at registration time based upon SNR and/or received power criteria measured by the CMTS during the initial ranging or registration process, and further subgrouping are made later based upon criteria measured during subsequent data communications. Subgroupings can be based upon: the received signal-to-noise ratio; the packet loss rate; the bit error rate; the byte error rate; the received signal power; the RS codeword error rate or the cable node to which a cable modem is coupled.

The apparatus needed to carry out the invention is a conventional DOCSIS CMTS with its control process programmed to carry out any of the processes within the above defined genus of the invention.

DETAILED DESCRIPTION OF THE PREFERRED AND ALTERNATIVE EMBODIMENTS

Figure 1:
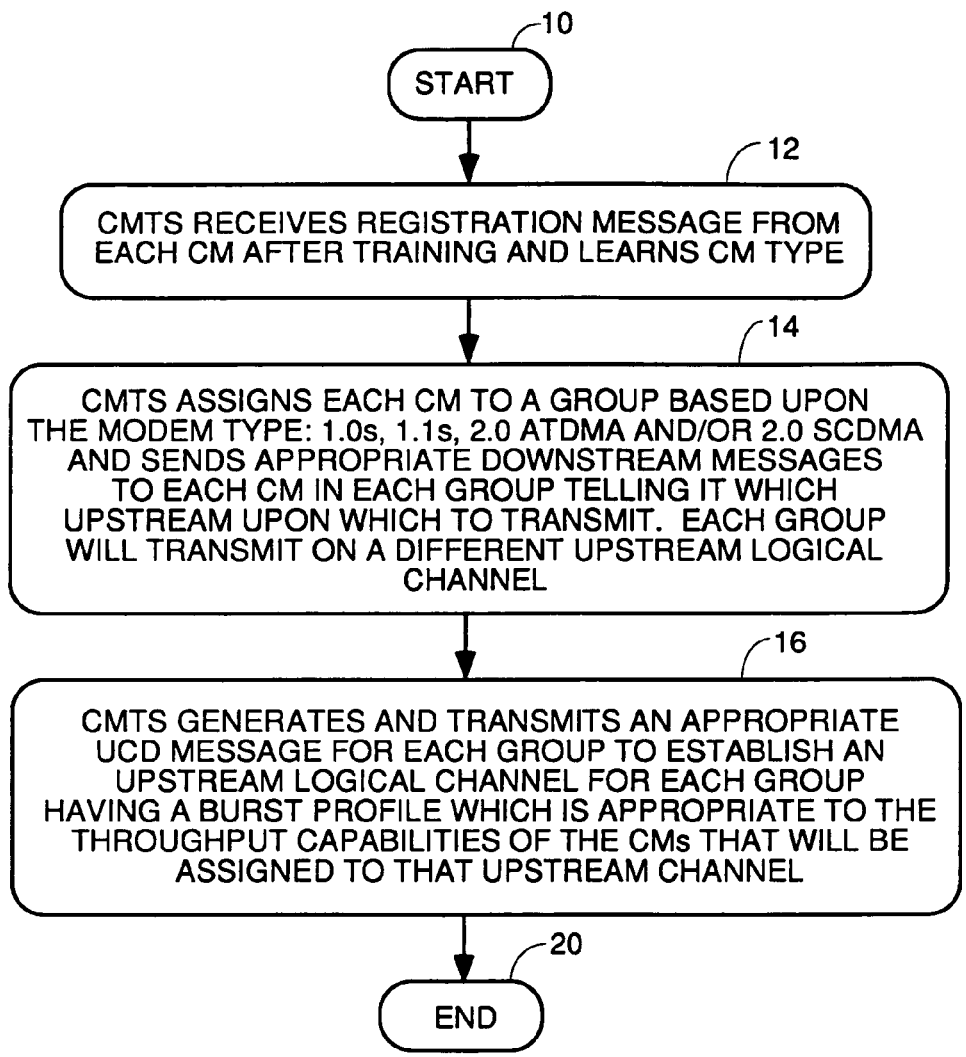
FIG. 1 is a flowchart of a process to group modems into different groups based upon modem type only (no subgrouping) and to establish a different upstream logical channel for each and to command each CM to transmit upstream on a logical channel having a burst profile suited to the modem types assigned to the logical channel. The main point is that 1.0 and 1.1 CMs are separated into separate logical channels having burst profiles optimized for the type of CM in each channel.

A logical upstream channel is defined in the DOCSIS specifications as a MAC entity identified by a unique channel ID and for which bandwidth is assigned by an associated MAP message. A single physical upstream channel is an upstream carrier signal modulated with digital data at any one or a plurality of different symbol rates so as to have any of four different bandwidths. A single physical RF carrier may include multiple logical upstream channels, each having a different burst profile. Each logical upstream channel is described by an Upstream Channel Descriptor Message (UCD). The UCD and MAP messages associate with an upstream logical channel completely describe the logical channel.

A UCD message is a MAC message which is sent downstream by the Cable Modem Termination System (CMTS) to a plurality of cable modems (CMs) to define the characteristics of the logical upstream channel to which the UCD message pertains. UCD messages include: modulation rate; frequency; preamble pattern; extended preamble pattern; first burst descriptor; second burst descriptor; third burst descriptor; etc. The UCD message for each upstream logical channel must be transmitted by the CMTS at a periodic interval to define the characteristics of the upstream logical channel to which it pertains. A separate UCD message must be sent for each logical upstream that is currently available for use. The details of many of the concepts used herein are given in the DOCSIS 1.0, 1.1 and 2.0 specifications, all of which are hereby incorporated by reference.

Cable modems have different upstream throughput because of the following reasons.

1) DOCSIS 1.0 CMs have low throughput because they do not have a transmit equalizer and they usually use QPSK modulation.
2) DOCSIS 1.1 CMs have a transmit equalizer which is only 8 taps. This gives a lower throughput than DOCSIS 2.0 CMs. DOCSIS 1.1 CMs generally use 16-QAM modulation so they have a higher througput than DOCSIS 1.0 CMs.
3) DOCSIS 2.0 CMs have a 24-tap transmit equalizer, so they can use higher throughput modulation up to 64-QAM.
4) CMs which cannot overcome high path attenuation with their power amplifiers are received at the CMTS with lower received power thereby yielding lower signal-to-noise ratio.
5) Different CMs have different paths through the cable plant, and these different paths contribute different distortions and echoes which can create different levels of receive errors for each CM.
6) Different CMs can have defects in their design or manufacture which can cause signal distortion. This causes errors in reception and requires downgrading the burst profile to reduce the throughput and/or add more error detection and correction capability.
7) DOCSIS 2.0 SCDMA and ATDMA modes have different throughput because they have different schemes that handle noise and they handle impulse noise differently.

The DOCSIS specifications in the prior art suggest dividing upstream logical channels into groups based upon modem types: DOCSIS 1.0 and 1.1 modems should be grouped on one logical channel, and DOCSIS 2.0 ATDMA and DOCSIS 2.0 SCDMA modems should each have their own groups and operate on separate upstreams.

This approach is better than no grouping but still is inadequate for the reasons stated above since there are other factors which affect throughput which the DOCSIS specification do not take into account.

Grouping Factors

The approach according to the invention is to divide the CMs into groups or logical channels based upon one or more of the following factors:
1) modem type with DOCSIS 1.0 and DOCSIS 1.1 CMs are each segregated into different groups each with their own upstream, and DOCSIS 2.0 CMs are initially grouped together. Subsequent monitoring of 2.0 modem performances can lead to the conclusion that they need to be subdivided into separate logical groups each with its own upstream with a burst profile tailored to the throughput ability of the group.

The following factors can also be used to segregate CMs into logical groups over and above the logical groups 1.x, ATMDA and SCDMA recommended by the DOCSIS specifications. In one species within the genus, logical grouping by modem type with 1.x and 2.0 modems separated into two logical groups with different upstream burst profiles is performed first. This is followed by subgrouping within each one of these type groups, based upon one or more of the following throughput ability factors.
2) received signal SNR;
3) the packet loss rate;
4) the bit error rate;
5) the byte error rate;
6) the received signal power;
7) the cable node to which a CM is connected since some cable nodes may be less capable than others or be suffering from problems.

The packet loss rate can be calculated using the HCS and CRC error. The MAC header of each burst has a two byte Header Check Sequence (HCS) to ensure the integrity of the MAC header. The HCS is calculated using CRC-CCITT polynomial defined in ITU-T-S.25. The variable length PDA includes a pair of 48 bit addresses, data and a CRC field. The DOCSIS MAC protocol protects against errors through the use of checksum fields across both the MAC header and the data portions of the packet. All MAC messages for management are protected by a CRC covering the entire message. Any message with a bad CRC must be discarded by the receiver.

Moving of CMs to different upstreams based upon packet loss rate is preferably done using hysteresis as follows:
If packet loss percentage>PACKET_LOSS_REQUIRED*
   (1+TH1) Move CM to a lower throughput logical channel
If packet loss percentage<PACKET_LOSS_REQUIRED*
   (1−TH2) Move CM to a higher throughput logical channel.
End TH1 and TH2 are packet loss constants, preferably programmable, used to provide hysteresis so that switching does not happen too frequently (chatter) caused by momentary dips or increases in packet loss percentage. The packet loss percentage is calculated for data bursts that do not have contention grants or unsolicited grant service because these grants may be empty or have collisions. The packet loss percentage is averaged over a sufficiently long time (for example 1000 packets) so that channel switching is not done when channel conditions change for a short time. After switching, the packet loss counter should be reset and restart the count.

The same holds true for subgrouping by SNR and moving CMs to lower or higher throughput upstream channels. Hysteresis constants should be used for the comparison and SNR should be calculated for data burst not transmitted during contention grants. SNR should be averaged over a sufficiently long time to avoid changing channels on momentary dips or increases in performance. The SNR_REQUIRED constant is a constant set on a per logical channel basis. Typical SNR values are set to get packet loss rates of about 0.5%.

Byte error rate is calculated according to the following formula:

$$ByteErrorRate = \frac{(T+1)*n\_error}{(k+2T)*n\_total} \quad (1)$$

where
T is the number of the maximum correctable bytes in an RS codeword;
T+1: when there is an uncorrectable RS codeword, the is a high probability of having T+1 errored bytes;
n_error: the total number of uncorrectable RS codewords of a specific IUC (burst type) in a certain time interval;
n_total: the total number of received RS codewords of a specific IUC in a certain time interval;
k: the number of information bytes in an RS codeword of a specific IUC; and
k+2T: the codeword length in bytes.

Since on the average only half the bits are erroneous, the bit error rate is given by:

$$BER = \frac{0.5*(T+1)*n\_error}{(k+2T)*n\_total} \quad (2)$$

Generally, the long data grant is used to calculate athe BER or byte error rate.

The Interval Usage Code (IUC) is defined by DOCSIS as a field in the MAP and UCD messages to link burst profiles to grants. In other words, the IUC tells what kind of burst may be transmitted during each grant. The IUC codes map to sets of burst parameters such as modulation, RS error correction capability T, etc.

One way to increase the number of supported logical channels by the CMTS physical layer is that the logical channels will use only the long data grant and not the short data grant. Then the CMTS PHY chip has 2 IUCs (short and long data grants) that can be used for 2 logical channel data grants. The other IUCs of REQ ranging) should be common to all logical channels.

Burst Profiles Examples

| Burst Profile # | Use for Impulse Noise Channel? Yes/No | Net Data Rate @ 2.56 Msps | Modulation | RS | % bit rate from max |
|---|---|---|---|---|---|
| 1 | Yes | 2.3 Mbps | QPSK | k = 16 t = 10 | 22% |
| 2 | Yes | 3.0 Mbps | QPSK | k = 28 t = 10 | 29% |
| 3 | yes | 4.0 Mbps | QPSK | k = 78 t = 10 | 39% |
| 4 | no | 4.7 Mbps | QPSK | k = 235 t = 10 | 46% |
| 5 | yes | 5.1 Mbps | 16-QAM | k = 20 t = 20 | 50% |
| 6 | yes | 6.4 Mbps | 16-QAM | k = 39 t = 10 | 62% |
| 7 | yes | 8.1 Mbps | 16-QAM | k = 78 t = 10 | 79% |

-continued

| Burst Profile # | Use for Impulse Noise Channel? Yes/No | Net Data Rate @ 2.56 Msps | Modulation | RS | % bit rate from max |
|---|---|---|---|---|---|
| 8 | yes | 9.4 Mbps | 16-QAM | k = 235 t = 10 | 92% |
| 9 | no | 10.24 Mbps | 16-QAM | k = 16 t = 0 | 100% |

Definitions

A logical channel in the DOCSIS upstream is defined in the DOCSIS specifications as, "a MAC entity identified by a unique channel ID and for which bandwidth is allocated by an associated MAP mesage. The associated UCD (Upstream Channel Descriptor—the burst profile) and MAP messages (which CMs can transmit and when) completely describe the logical channel." A physical upstream channel may support multiple logical upstream channels in different time intervals. Both physical upstream-channels and logical channels will be referred to as upstream channels or upstreams in the specification and the claims since it does not make any difference for purposes of the invention exactly what the form of the upstream implementation is.

A downstream group is a group of one or more downstreams to which cable modems (CMs) are coupled that are to share one or more DOCSIS upstreams which may be of different DOCSIS types (1.0, 1.1, 2.0 ATDMA, 2.0 SCDMA etc. and may have different throughput levels even within a type).

The UCD message is defined by the DOCSIS specs as "the MAC Management message used to communicate the characteristics of the upstream physical layer to the cable modems." Basically, the transmission characteristics of each logical channel, as defined by the corresponding UCD message, are separated into three portions: 1) channel parameters; 2) burst profile attributes, and 3) user unique parameters.

In the appended claims, the term "burst parameters" is intended to include all those channel parameters, burst profile attributes and user unique parameters needed by the shared back end demodulator to properly process each burst. The logical channel parameters include: a) the symbol rate which can be any one of 6 different rates from 160 ksym/sec to 5.12 Msym/sec in octave steps; b) the center frequency; and c) the 1536-bit preamble superstring that is prepended to at least some bursts; and d) the SCDMA channel parameters. These characteristics are shared by all CMs on a given channel or sub-channel (hereafter logical channel may be used to refer to either channel or sub-channel).

The burst profile transmission characteristics of a logical channel, in the preferred embodiment, include: modulation (QPSK, 64 QAM, 128 QAM etc.), differential encoding on or off; Trellis or TCM encoding on or off; preamble length, preamble value offset; preamble type (QPSK 0 or QPSK1), RS (Reed-Solomon) error correction T value from 0 to 16 where 0 is no FEC bits to 16 for the maximum where the number of codeword parity bytes is 2×T, RS codeword length, scrambler seed, max burst length in minislots, guardtime from 5 to 255 symbols for TDMA channels and 1 symbol for SCDMA channels, last codeword (fixed or shortened), scrambler on or off, byte interleaver depth, byte interleaver block size, SCDMA spreading on or off, codes per subframe, and SCDMA interleaver step size. User unique parameters may vary from user to user even when on the same channel and same burst type and include such things as: power level; offset frequency (defines center frequency of channel to transmit on); ranging offset to achieve minislot boundary alignment at CMTS (which also achieves upstream chip clock alignment between the upstream chip clock generated at the CMTS and the chip clock embedded in the received signal at the CMTS receiver—a state which is referred to herein as "phase coherence"), burst length in minislots if variable on the specified channel (changes from burst to burst); and the transmit equalizer coefficients (up to 64 coefficients specified by 4 bytes per coefficient—2 real and 2 complex).

Profile robustness refers to the UCD factors defined above and how they are set for any particular logical channel. More robust profiles have burst parameters that have lower symbol rate, less complex modulation constellations and/or allow for greater error detection and correction capability (forward error correction or FEC). Greater FEC results in lower throughput because there is more overhead consumed in each burst with forward error correction factors such as code word length, byte interleaver depth and block size, RS error correction T value, RS codeword length, guardtime, preamble length, Trellis encoding on or off, etc.

Grouping Based Upon DOCSIS 1.0 and 1.1

Although the DOCSIS specifications suggest grouping DOCSIS 1.0 and 1.1 modems in the same group, one species of the invention segregates them into separate groups and, in some species subdivides each 1.0 and 1.1 group into separate logical channels based upon other factors such as received signal power or SNR or packet loss rate, bit error rate, etc. Other species may lump 1.0 and 1.1 CMs into one logical group and then subdivide the group into one or more other upstream channels based upon monitoring for overperformance or underperformance. If some CMs are underperforming, an upstream channel which is more robust will be created and these underperforming modems moved to it. If some CMs are overperforming, an upstream channel with greater throughput will be created and these overperformers moved to it. Monitoring for overperformance or underperformance can be by SNR, received power, packet loss rate, bit error rate, byte error rate, etc.

DOCSIS 1.0 CMs generally require a more robust burst profile because they do not have a transmit equalizer. This yields lower throughput than DOCSIS 1.1 CMs which have a transmit equalizer and can therefore transmit at higher throughput rates and require less robust burst profiles. DOCSIS 1.1 CMs generally can use 16-QAM modulation (4 bits per symbol transmitted—16 constellation points) and symbol rate of 2.56 megasymbols per second (Msps), while DOCSIS 1.0 CMs generally use QPSK (2 bits per symbol—4 possible symbols). Because of these very different modulation types and symbol rates and the lack of a transmit equalizer (more errors resulting in the need for burst profiles with more overhead for forward error correction to detect and correct errors) in a DOCSIS 1.0 CM, less data can be transmitted per second upstream than can be transmitted by a DOCSIS 1.1 CM. This is why DOCSIS 1.0 and DOCSIS 1.1 CMs are separated into separate logical groups in the invention contrary to the teachings of the DOCSIS specification.

CMs may be moved to a different upstream either by the CMTS via downstream UCC (upstream channel change) or DCC (dynamic channel change) messages or manually by the cable operator.

Grouping Based Upon DOCSIS 2.0 ATDMA and DOCSIS 2.0 SCDMA

DOCSIS 2.0 ATDMA CMs have different schemes for handling noise and impulse noise than DOCSIS 2.0 SCDMA modems. This results in different throughput, so these modems should be grouped in different groups, as recommended by the DOCSIS specifications, but subgrouping by throughput ability is used in the invention to further subdivide the ATDMA and/or SCDMA logical groups into subgroups based upon throughput ability as indicated by link quality parameters: the received signal-to-noise ratio; the packet loss rate; the bit error rate; the byte error rate; the received signal power; the RS codeword error rate or the cable node to which a cable modem is coupled.

FIG. 1 is a flowchart of a process to group modems into different groups based upon upstream throughput capability based upon modem type alone (no subgrouping) with 1.0 and 1.1 CMs in separate groups, and to establish a different upstream logical channel for each and to command each CM to transmit upstream on a logical channel having a burst profile suited to the modem types assigned to the logical channel. The process starts at 10 and proceeds to step 12 where the CMTS receives initial registration communications from each CM. Registration occurs for each cable modem after it powers up and does its ranging and training, but cable modems may re-register whenever they change upstream logical channels in some embodiments. The step of receiving registration communications in the CMTS in the appended claims is intended to cover both cases.

During this registration process, the CMTS learns the type of the CM which is registering. CMs scan for a valid DOCSIS downstream when they first power up. They then determine which upstreams are linked to that downstream and join the upstream most compatible with the modem type and send initial training bursts. After training is completed, the CM registers with the CMTS and the registration messages tell the CMTS what type of service (DOCSIS 1.0, 1.1, ATDMA or SCDMA) each CM is. The registration messages and/or training bursts also tell the CMTS to which downstream the CM is tuned and on which upstream it is operating.

In step 14, the CMTS assigns each CM which registers to a group comprised of other CMs of the same type. All DOCSIS 1.0 CMs are put into one group and DOCSIS 1.1 CMs are put into another group. All DOCSIS 2.0 ATDMA CMs are put into a third group, and all DOCSIS 2.0 SCDMA modems are put into a fourth group. In alternative embodiments, the 2.0 CM can all be grouped into one logical channel which is either ATDMA or SCDMA. Also in step 14, the CMTS sends a DCC (Dynamic Channel Change) or other DOCSIS message to each CM that needs to be moved to another upstream channel telling that CM to which upstream logical channel it has been assigned. The CM then looks up the UCD message for that logical channel and uses the burst profile information therein to configure itself to transmit according to the modulation type, symbol rate, center frequency, various forward error correction factors, etc. for the upstream logical channel, as defined in the UCD message.

In step 16, the CMTS generates an sends an appropriate Upstream Channel Descriptor (UCD) message for each group. Each UCD message establishes a separate upstream logical channel having a burst profile which is appropriate for the CM throughput capabilities of the CMs in the group which will be assigned to transmit on that logical channel. These UCD messages are transmitted to all CMs and each CM receives each UCD message and stores it. Each UCD message has an ID for the logical upstream channel to which it pertains.

Step 20 ends the process.

Subgrouping Based Upon Received Power, SNR, etc.

Some cable plants, notably in Asia, have cable path attenuation that is so high, it cannot be overcome by the CM's power amplifier. In other words, even though the CMTS commands the CM to transmit with more power, the power amplifier has reached the top of its power range and still its signal does not have enough power when it reaches the CMTS. To overcome this problem, cable operators use the following techniques.

1) They can reduce the required power for upstream transmissions (the required power level at which an upstream burst must be received at the CMTS) to a level which is low enough that even CMs that have a high attenuation path have enough transmit power to meet the requirement. The lower received power reduces the SNR for the entire upstream channel, and penalizes all modems for just a few who have high attenuation paths. The lower SNR causes more errors thereby requiring more overhead for forward error correction to keep the errors under control.

2) They can modify the modem to add a more powerful transmit power amplifier. This requires the cable modem manufacturers to manufacture a special class of CMs just for these customers or requires the customers to do it themselves. With thousands of deployed modems, this is a very expensive solution.

3) They can use SCDMA modems with a power management mode which uses fewer spreading codes for CMs which have a high attenuation path so there is more power transmitted per spreading code. This requires the cable operator use SCDMA modems and have head end equipment compatible therewith which many cable operators do not yet have. This is a good solution because only the SCDMA modems with the power problem are penalized by having to use fewer spreading codes, but this solution does not work for TDMA cable modems so systems which have not yet upgraded their equipment to be DOCSIS 2.0 compatible cannot use this solution.

The method of the invention proposed here solves the problem for modems which have insufficient power or inadequate SNR in either a TDMA or SCDMA upstream environment so all systems can use the method. This method divides up the CMs into at least two groups. One group transmits on one logical channel with a high throughput and which contains only CMs which do not have a high attenuation path or at least which have adequate power and/or adequate SNR to meet the received power and/or SNR specification at the CMTS. The second group is comprised of CMs that have inadequate power and/or inadequate SNR to meet the upstream received power and/or SNR specification of the CMTS. These modems are grouped to transmit on a different logical channel with a more robust burst profile (more overhead for FEC) and lower throughput. The burst profile for this logical channel will be such as to be able to handle the lower received power and/or the lower SNR. Also, lower complexity modulation constellations such as QPSK modulation may be used. Further, more aggressive FEC overhead may be used such as RS error correction with a sufficient number of error detection and correction (ECC) bits to correct worst case scenarios for errors caused by the low received power or inadequate SNR can be used on the lower throughput logical channel.

On the higher throughput channel with CMs that have sufficient power and/or a high SNR, fewer errors will result so, for example, 16-QAM or better modulation, a higher symbol rate and RS encoding with fewer numbers of ECC bits may be used. For DOCSIS 2.0 CMs, 64-QAM modulation can be used.

Figure 2A:
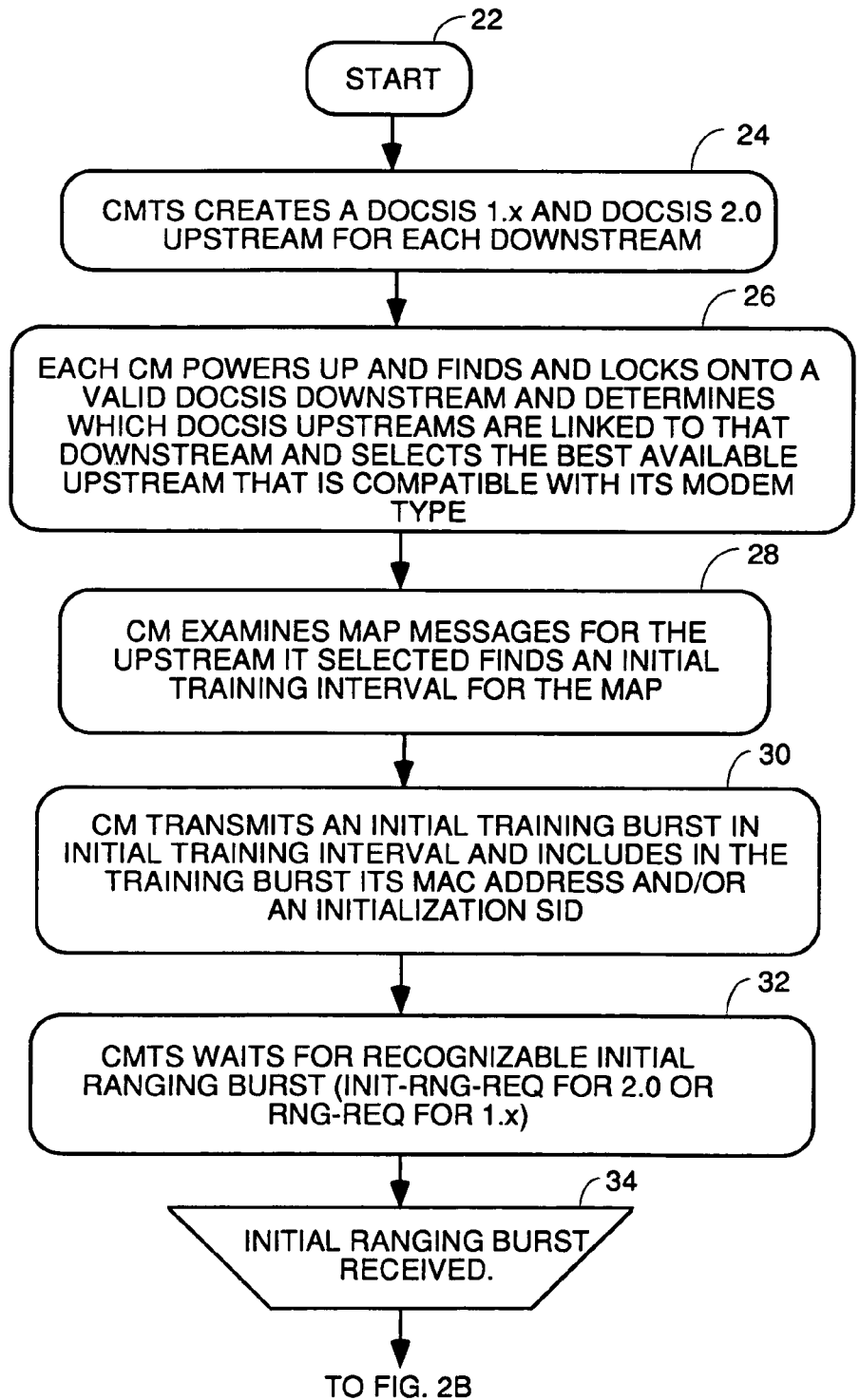
FIG. 2, comprised of FIGS. 2A through 2D, represents species 4 in the summary of the invention. It is the preferred method to initially set up the groups based upon modem type with SNR and received power monitoring during initial training to establish one or more low SNR or low power channels if necessary to achieve successful registration even for CMs with power shortfall problems.
Figure 2B:
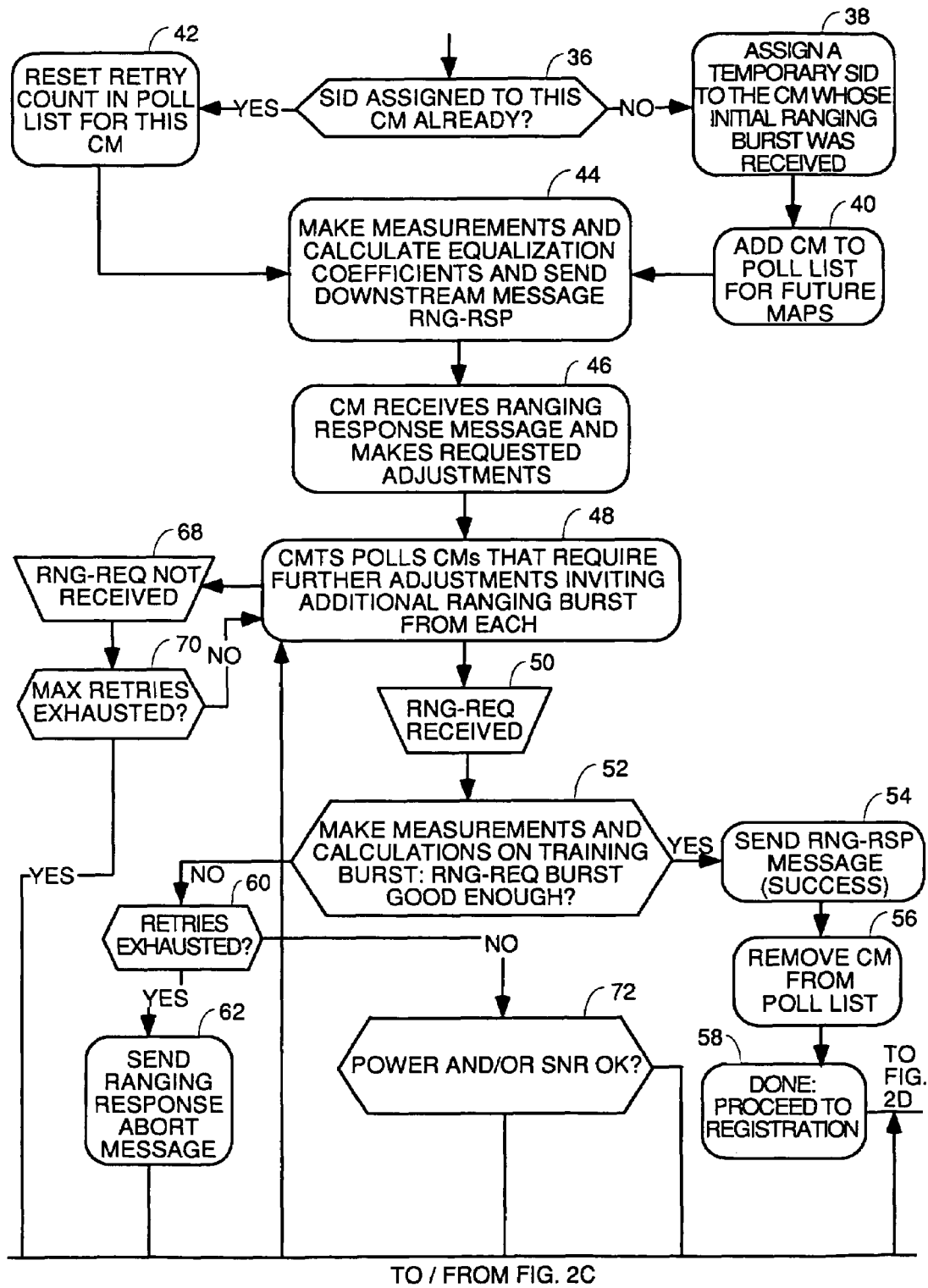
Figure 2C:
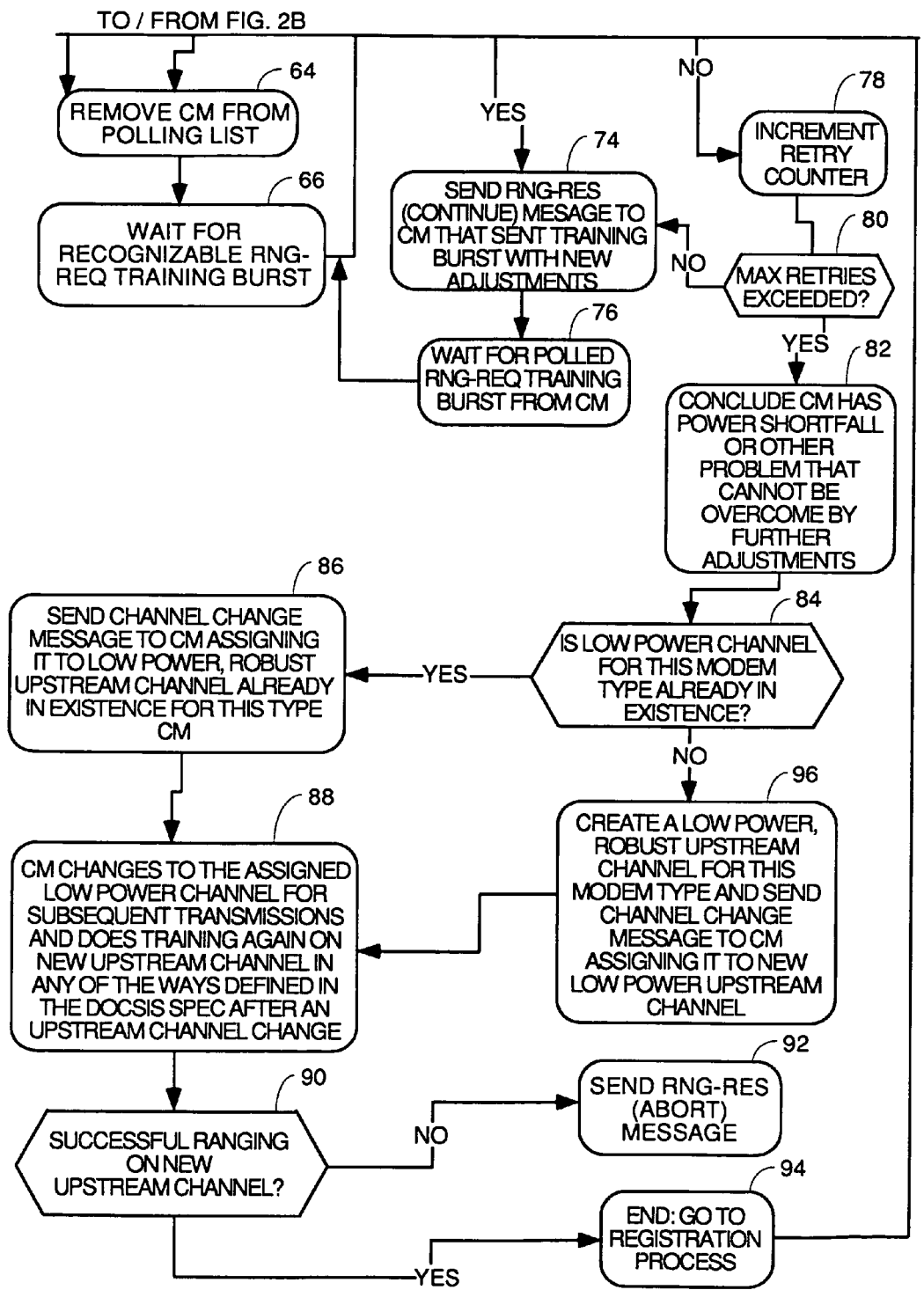
Figure 2D:
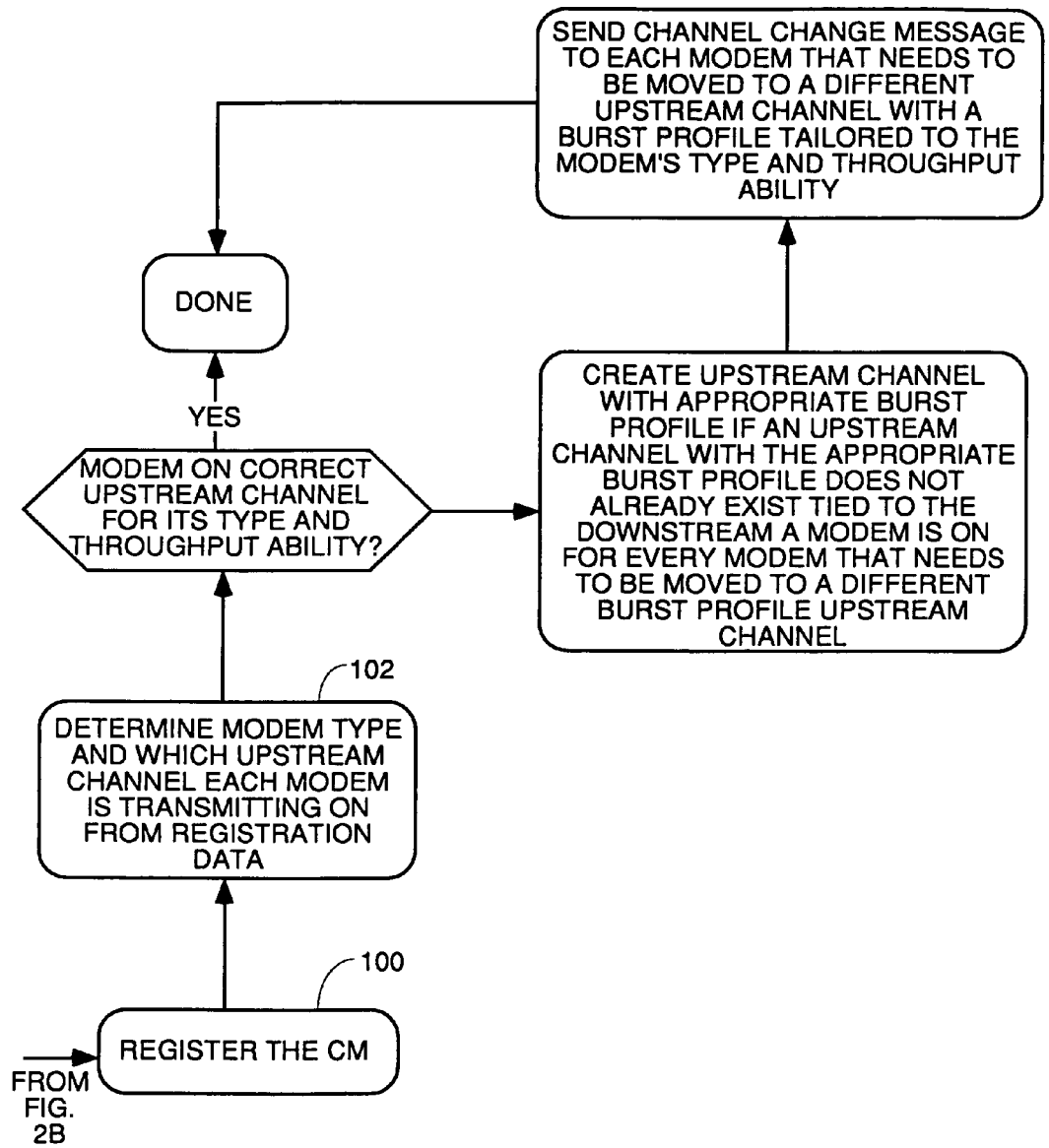
Figure 3A:
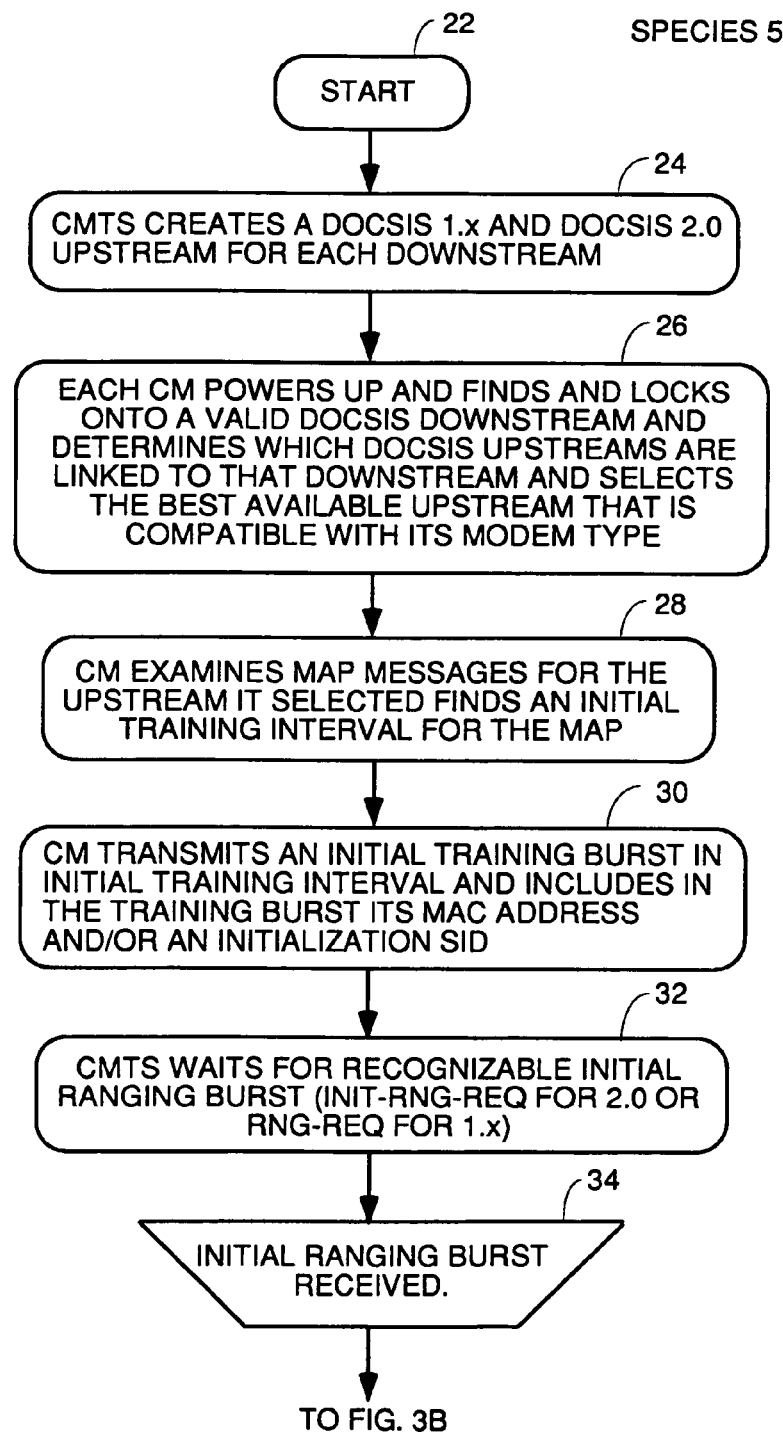
FIG. 3, comprised of FIGS. 3A through 3E, is a flowchart of the process of species 5 for post registration monitoring and subgrouping based upon over or under performance.
Figure 3B:
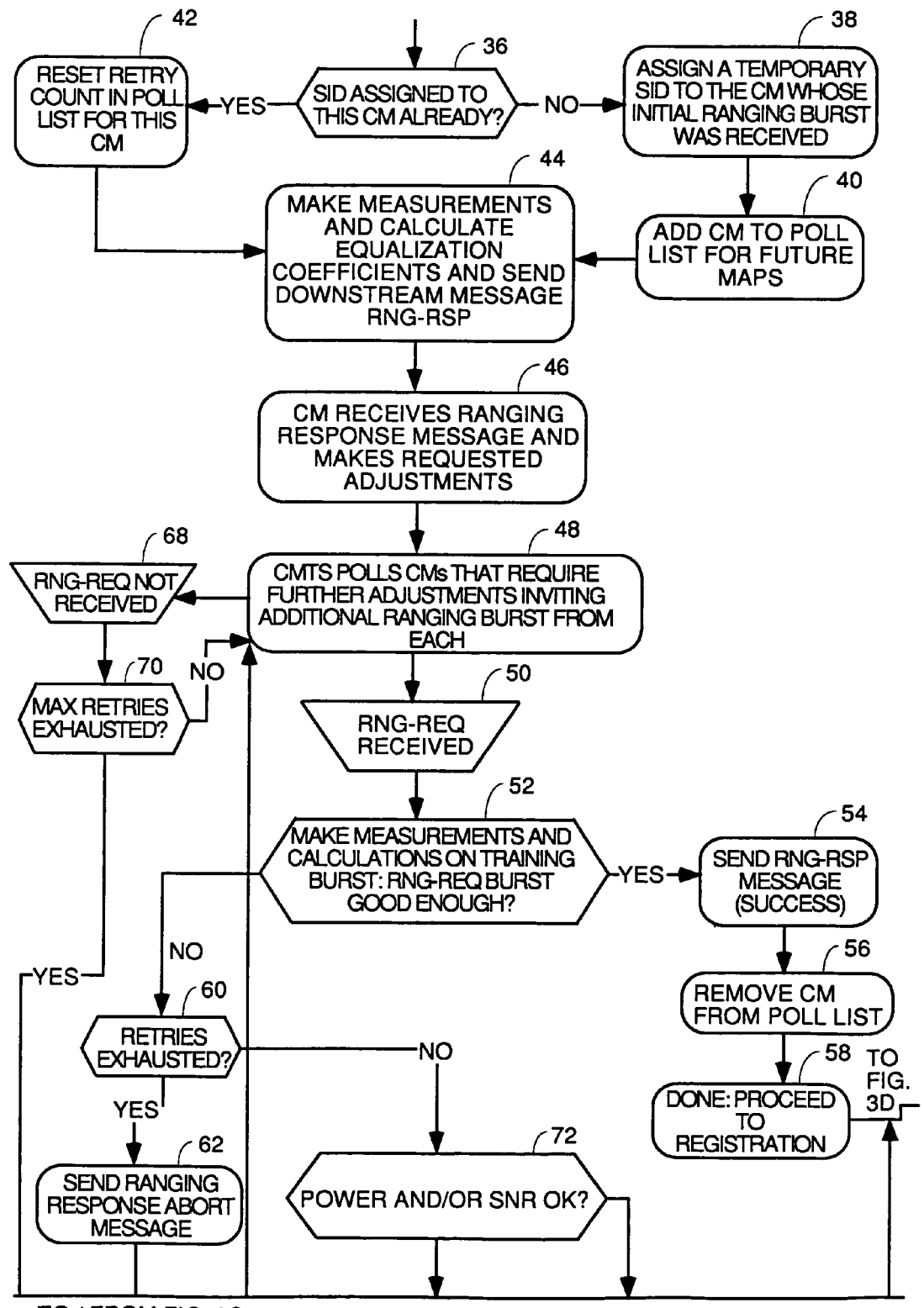
Figure 3C:
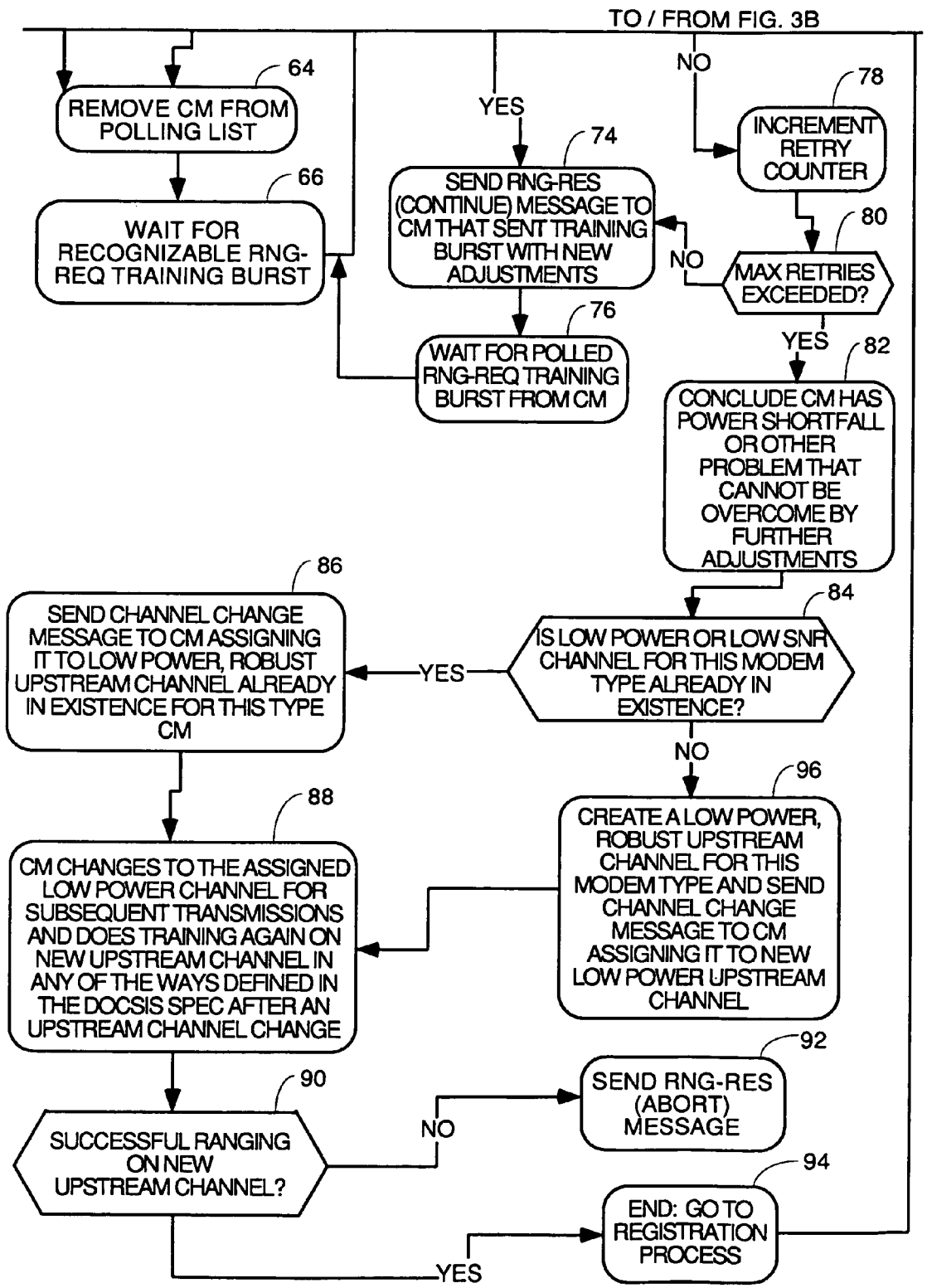
Figure 3D:
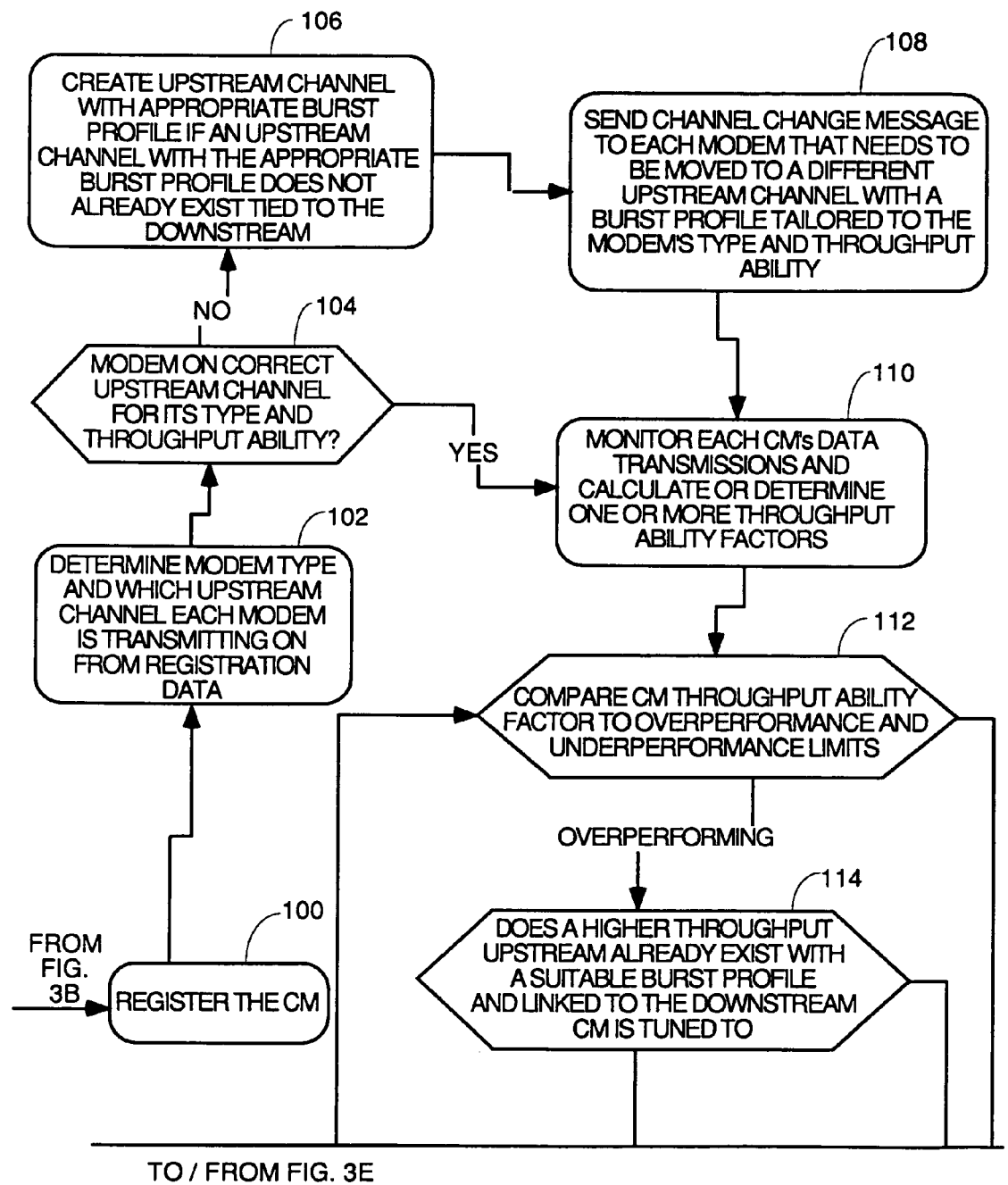
Figure 3E:
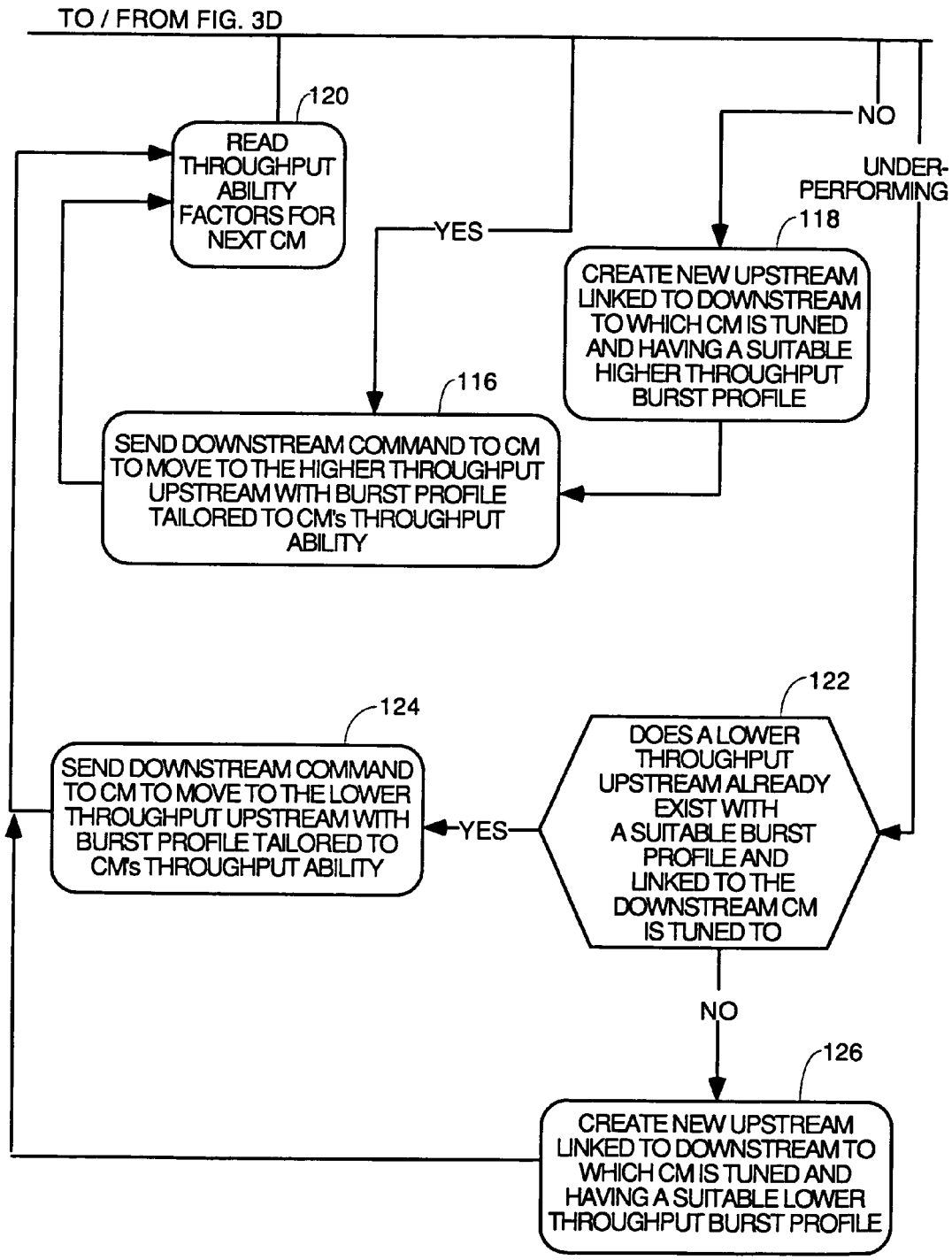

A flowchart shown in FIG. 2 comprised of FIGS. 2A through 2C represents species 4 in the summary of the invention. It is the preferred method to initially set up the groups based upon modem type with SNR and/or received power monitoring during initial training to establish one or more low power channels if necessary to achieve successful registration even for CMs with power shortfall and/or SNR problems. The process starts at step 22, and at step 24, the CMTS assumes that 1.X and 2.0 CMs are present and creates a 1.x upstream and 2.0 upstream for each downstream the CMTS is transmitting.

In step 26, each CM powers up (this happens at random times whenever the user wishes to use the CM or resets it) and listens for, finds and locks onto a valid DOCSIS downstream. That downstream carries UCD messages that are broadcast to every CM that define the upstreams that are linked to that downstream and the burst profiles of each. There will be at least one 1.0 and at least one 2.0 upstream present in the preferred embodiment. However, in other embodiments, there may also be a 1.x upstream with a burst profile optimized for 1.1 CMs and several types of 2.0 upstreams present such as 2.0 ATDMA and/or 2.0 SCDMA (2.0 upstreams with different burst profiles, one optimized for ATDMA and/or one for SCDMA). The cable system operator will configure the CMTS to create a separate upstream for at least 1.x and 2.0 modems for every downstream using UCD messages (if both 1.x and 2.0 CMs are available in the channel). Each CM looks at the UCD messages transmitted in its downstream and determines which upstream matches its type. The CM then picks the best available upstream for its type (if there are multiple upstreams which the CM can join) or picks the single available upstream for its type, and configures its upstream transmitter to transmit on that upstream.

In step 28, each CM examines the MAP messages which pertain to the upstream it has selected which are transmitted in the downstream to which it is locked. The CM finds in these MAP messages the location in time of an initial training interval.

In step 30, each CM transmits an initial training burst during the initial training interval and includes in the burst the CM's MAC address and an initialization service Identifier (SID). For 2.0 CMs, this initial training burst is called an INIT-RNG-REQ in the DOCSIS spec. For 1.x CMs, this initial training burst is called a RNG-REQ burst. The SID in the initial training burst will later be changed by the CMTS to a primary SID which will be sent to the CM in a ranging response message. The initial training burst also includes the downstream channel ID of the downstream channel the CM locked onto and upon which a UCD message was received describing the upstream on which the initial training burst was sent.

The steps that follow are steps the CMTS performs for initial ranging from the DOCSIS 2.0 specification, FIG. 11-8, but these steps have been modified to reflect the changes that are required to practice the invention. The initial ranging process is a two phase process which is designed to perform enough iterations of training that the CM gets into precise synchronization with the CMTS such that a registration process can be carried out efficiently with few errors. The iterations are comprised of the CM transmitting a training burst followed by the CMTS making calculations regarding various factors and sending back correction messages to the CM which is followed by the CM making corrections and sending another training burst and repeating until the CM has been properly trained or the allowable number of iterations has been exhausted.

In step 32, the CMTS waits for a recognizable initial ranging burst from a CM. Step 34 represents receipt of the initial ranging burst.

Step 36 determines if a SID has been assigned to the CM already. CMs start out with initialization SIDs in their initial ranging bursts, but the CMTS will assign a temporary SID after receiving their initial ranging burst. The MAC address in the initial ranging burst allows the CMTS to determine from which CM each initial ranging burst came.

If step 36 determines that a SID has not been assigned to the CM whose initial ranging burst was just received, step 38 is performed to assign a temporary SID to this CM. Step 40 is then performed to add the CM to a polling list for future MAPs. This means that this CM will be added to the list of CMs which will receive invitations to send further training bursts if necessary during the training process to get the CM into synchronization with the CMTS. If step 36 determines that a SID has already been assigned to this CM, a retry count in the poll list for this CM is reset.

After either step 42 or step 40 is performed, step 44 is performed. Step 44 represents the process of making timing, frequency and power offset measurements and calculation of the SNR and upstream equalization coefficients on the initial ranging burst in the CMTS. These measurements (except for the SNR) are then sent in a downstream message (RNG-RES) to the CM that sent the initial ranging burst to cause it to readjust its transmit parameters. In step 46, the CM receives the ranging response message and makes the requested adjustments in its transmit power, frequency and timing and uses the equalization coefficients to adjust the coefficients of its transmit equalization filter. Phase two of the initial ranging process now starts.

Step 48 represents the process of polling the CMs on the list of CMs that have sent initial training bursts with invitations in MAP messages for the particular upstream each CM is on. Each invitation invites a particular CM to send an additional ranging burst during a specified interval. Step 48 also represents waiting for these polled RNG-REQ training bursts. Each training burst will contain the temporary SID assigned the CM by the CMTS. Step 50 represents the receipt by the CMTS of a ranging burst from a CM. This ranging burst will have been sent using the new parameters previously sent the CM in response to its initial ranging burst.

Step 52 represents the process of determining if the CM's ranging burst is good enough for the required synchronization. Measurements of power, frequency and timing offset will be made and equalization coefficients will be calculated. Other parameters such as signal-to-noise ratio (SNR); bit error rate; byte error rate, RS codeword error rate and packet error rate will also be measured in some embodiments, but usually these measurements are not made until after registration. These parameters as well as power shortfall can be used in post registration processes in some embodiments to group modems with problems onto more robust upstream channels (channels with a lower throughput and more overhead devoted to forward error correction). Any one or a combination of these parameters can be used as an indicator that a CM has to be moved to a lower throughput, more robust upstream channel. In the preferred embodiment, test 52 determines if the power, frequency, timing and equalization coefficients and/or SNR (hereafter the ranging parameters) are within acceptable limits to end the initial training process and proceed to registration. If all these ranging parameters are acceptable, step 54 is performed to send a ranging response message to the CM who sent the training burst indicating training is complete and has been successful. Step 56 then removes the CM from the polling list, and the process finishes as step 58 where processing moves on to the registration process.

If test 52 determines that one or more of the ranging parameters is not within limits, test 60 is performed to determine if the number of permissible retries has been exhausted. If so, step 62 is performed to send a ranging response message to the CM telling it to abort the training process, and step 64 is performed to remove the CM from the polling list. Then, the CMTS waits for a recognizable training burst from a CM, as symbolized by step 66.

Returning to step 48, it is possible that the CMTS will poll a CM inviting another training burst and then not receive any, as symbolized by step 68. If that happens, the CMTS polls the CM again, and test 70 determines if the maximum number of retries at polling the CM has been exhausted. If not, step 48 is performed again to send another invitation to the CM to sending a training burst. If the maximum number of polling attempts to this CM has occurred, processing proceeds to step 64 to remove the CM from the polling list, and then processing proceeds to step 66 to wait for a recognizable RNG-REQ training burst in step 66 from another CM.

The modification to this DOCSIS initial training process occurs starting at step 72. In step 72, a test is made to determine if the particular criteria (received signal power or SNR) being used to determine if the CM which sent the training burst needs to be moved to another more robust channel so as to complete registration is within acceptable limits. Step 72 is performed if step 60 determines that the number of retries is not exhausted and if test 52 determines that the measured ranging criteria (power, frequency, timing and equalization coefficients and/or SNR) are not all within limits or otherwise acceptable. In one embodiment, the criteria compared to limits in step 72 is the received power. In another species, it is SNR. In another species, it is both SNR and received power. Step 72 will be reached if any one of the ranging criteria measurements is not acceptable and the retries are not exhausted. The criteria that may be used to determine if a CM needs to be moved to a more robust channel within its logical group will be referred to herein as the measurement criteria and are: received power and signal-to-noise ratio (SNR) although in other embodiments where other measurements are made by the CMTS on the initial training bursts such as bit error rate (BER), byte error rate and packet error rate (PER), those other criteria may also be used. The particular criteria being used is measured in step 52, or, if not in step 52, in step 72. Step 52 however only compares the ranging criteria of power, frequency and timing offset and equalization coefficients and/or SNR to standards of quality in reaching its conclusion as to whether the training burst is good enough. Step 72 compares the received power to the desired received power level again because it is possible to reach step 60 if any one of the ranging criteria is not acceptable or if all but the received power is acceptable. In alternative species where SNR is used, step 72 compares the SNR measured during the ranging bursts to an acceptable SNR level). Further, test 52 does not compare the other criteria such as BER or PER or SNR to limits in reaching its conclusion even though they might be calculated. Therefore, the exact status of the received power (or other criteria) must be determined in order to draw a conclusion regarding whether the CM must be moved to a more robust channel, and that is what step 72 is for.

If the received power or other criteria examined in step 72 is within acceptable limits, step 74 is performed to send a downstream message RNG-RES to the CM that sent the training burst telling it to continue ranging and sending it new adjustments to make. Then step 76 is performed to wait for a new polled training burst from the CM while processing vectors back to step 48 to invite the CM to send another training burst.

If step 72 determines that the power or other criteria being compared is not acceptable, step 78 is performed to increment the retry counter which keeps a separate record of the number of retries to get the received power or other criteria correct. Step 80 then determines if the maximum number of retries for adjusting received power (or the other measurement criteria) have occurred.

If step 80 determines that the maximum number of retries have not been exceeded, steps 74 and 76 are performed again to send a downstream RNG-RES message giving the CM new adjustments on the measurement criteria trying to be improved and telling the CM to that ranging status is "continue". Step 76 waits for a new training burst, and step 48 invites a new training burst.

If however, step 80 determines that the maximum number of retries to get the received power or other measurement criteria right have occurred, the CMTS concludes in step 82 that the CM has a power shortfall or some other problem that cannot be overcome by further adjustments. This means that the CM must be moved to a channel with a lower throughput (lower symbol rate, less complex modulation) and more robust forward error correction properties to allow successful communication with this CM. Such a more robust channel with lower throughput and aggressive forward error correction burst profile will hereafter be referred to as a low power channel even though a bad SNR, PER, BER or byte error rate may be the problem in some speceis that causes the CM to be moved to the more robust channel.

The first step in moving the CM to a low power channel is the determination in step 84 as to whether such a low power channel for this modem type has already been created. The process of FIGS. 2A-2C then finds the CMs that have a power shortfall or other problem that cannot be resolved by adjustments during the initial training interval and moves them to a low power channel for their modem type.

If step 84 determines that a low power channel already exists for the modem type, step 86 is performed to send a channel change message to the CM. The channel change message assigns the CM to the already existing low power channel for CMs of its type. Step 88 represents the process of the CM receiving this message and changing its configuration to transmit on the low power channel to which it has been assigned. Step 88 also represents the process of the CM performing one of the training regimens specified in the DOCSIS specification for retraining after an upstream channel change.

Test 90 determines if ranging has been successful for the CM on the new upstream channel. If not, step 92 is performed to send an abort ranging RNG-RES downstream message to the CM to tell it to stop ranging. A service call is in order for this CM. If test 90 determines that ranging has been successful on the new upstream channel, step 94 is performed to exit the training process and go to the registration process.

If test 84 determines that no low power channel has already been created for the type of CM which step 82 determined needs to be sent to a more robust channel, then step 96 is performed. In step 96, a low power channel with robust forward error correction and less complex modulation and/or lower symbol rate burst profile is created by creating and broadcasting an appropriate UCD message on the downstream to which the CM is tuned. After the new low power upstream is created, the CMTS sends a channel change message to the CM assigning it to the new low power channel. Thereafter, steps 88, 90, 92 or 94 are performed as previously described.

Both step 94 and step 58 transfer processing to the registration process with the CM that just completed initial training registers with the CMTS. The registration communications tell the CMTS what type of DOCSIS modem the CM is, and which downstream and which upstream it is on. This gives the CMTS the information it needs to make logical groupings on the appropriate upstreams. That process starts with step 100 on FIG. 2D to register the CM. Then, step 102 is performed to determine the modem type and which upstream channel the modem is transmitting upon from the registration data.

Test 104 is then performed to determine if the modem is on the correct upstream channel for its type and throughput ability. In one embodiment, the CMTS makes a determination here if any DOCSIS 1.1 CMs are transmitting on DOCSIS 1.x upstreams which have burst profiles which are not tailored for maximum throughput for DOCSIS 1.1 modems. Recall that DOCSIS 1.1 modems have 8-tap transmit equalizers which allows them to use 16-QAM modulation as compared to QPSK modulation which DOCSIS 1.0 modems usually use because of their lack of a transmit equalizer. Therefore, it is advantageous to separate DOCSIS 1.1 modems into a logical group assigned to an upstream with a burst profile which is optimized for the higher throughput ability of DOCSIS 1.1 modems instead of penalize all 1.1 modems by making them transmit on a 1.x upstream which has a burst profile tailored to the lower throughput of 1.0 modems. In other embodiments, the determination as to whether a CM is on a suitable upstream channel is based on SNR, bit error rate, byte error rate, packet loss rate, etc. Step 106 is then performed to create whatever upstreams are needed (which have not already been created) for the logical groups into which the CMs have been divided. Each upstream will be tied to the downstream to which a CM to be moved onto that upstream is listening and each will have a burst profile tailored to the modem type/modulation profile of the CM. As many different upstreams as are necessary to serve all the CMs and all the logical groups are created. Step 108 is then performed to send channel change messages to any CM that needs to be moved to a different logical group and a different upstream channel.

The above explains how 1.x modems are handled. What the CMTS does about 2.0 modems can be categorized into several different subspecies within this species of FIGS. 2A-2D. In some embodiments, step 24 represents the process of the CMTS creating 2.0 ATMDA and SCDMA upstreams and the CMs picking whatever upstream they are most compatible with after they latch onto the downstream. In this subspecies, steps 102, 104, 106 and 108 represents the CMTS leaving the 2.0 CMs in separate logical groups for ATDMA and SCDMA as established in defacto fashion by the CMs themselves when they picked an upstream. In another subspecies, steps 102, 104, 106 and 108 represent the process of the CMTS grouping all DOCSIS 2.0 CMs into one logical group and ordering them all to operate in SCDMA mode on one upstream channel having a burst profile optimized for 2.0 SCDMA. In other subspecies, some or all of the 2.0 CMs may be ordered to operate in ATDMA. ATDMA and SCDMA 2.0 modems need to be segregated into separate logical groups however if they are coexisting, each operating on an upstream having a burst profile tailored for the modulation profile in which the modem is operating.

The CMTS also determines which upstreams have already been defined and determines which upstreams it needs for the CMs that have registered. In step 106, the CMTS creates any additional upstreams with the needed burst profiles that it needs for the number of logical groups it has.

Species 5: FIGS. 3A through 3D

Species 5 is the same as species 4 from the summary of the invention but including post registration monitoring and subgrouping. The subgrouping is done within the already established groups established by the processing up through step 108. The subgrouping is based upon over or under performance of a CM for the upstream upon which it operates. Steps 22 through 108 of FIGS. 3A through 3D operate as previously described for FIGS. 2A through 2D.

The difference of species 5 over species 4 lies in the post registration and grouping monitoring and subgrouping. That process starts at step 110 on FIG. 3D. Step 110 symbolizes the process of monitoring each CM's post registration data communications and determination for each CM of one or more throughput ability factors. These throughput ability factors are:

2) received signal SNR;
3) the packet loss rate;
4) the bit error rate;
5) the byte error rate;
6) the received signal power;
7) the cable node to which a CM is connected since some cable nodes may be less capable than others or be suffering from problems;
8) RS codeword error rate.

These factors will change as conditions such as additive white guassian noise, burst noise, impulse noise, degradation of the cable plant, and other impairments improve or get worse over time.

Step 112 represents the process of comparing each CM's throughput ability factor(s) to overperformance and underperformance limits to determine if the CM is over performing the upstream channel it is on or underperforming. Overperforming would generally mean that the throughput rate is too low for a CM and the forward error correction factors are being underutilized such that the most efficient communication is not occurring because the symbol rate is too low, a more complex modulation could be used or less overhead in FEC bits could be used with a still acceptable error rate. An overperforming CM can be moved to an upstream channel with a higher throughput, more complex modulation constellation, less overhead consumed for forward error correction factors or both. An underperforming CM will be having a higher than acceptable bit error rate, byte error rate, packet loss rate, or received signal power or SNR which is too low. It needs to be switched to a lower throughput upstream channel with a lower symbol rate, less complex constellation, and/or more overhead consumed in FEC bits for more efficient communications.

If the CM is overperforming, the CMTS checks in step 114 if there is an upstream with a higher throughput (for example 16-QAM with smaller amounts of Reed Solomon encoding or higher modulation such as 64-QAM for DOCSIS 2.0)) for the CM's modulation profile/DOCSIS type which is linked to the downstream to which the CM is tuned. If a higher throughput upstream already is in existence which is linked to the downstream to which the CM is tuned and which has a burst profile tailored to the CM's throughput abilities, step 116 is performed to send a downstream command to the CM to cause it to move to the upstream so identified.

If step 114 determines that a higher throughput upstream which is linked to the downstream this CM is tuned to and which has a burst profiled tailored to the needs of the CM, then step 118 is performed to create a new upstream. This upstream will have a higher throughput and a burst profile established to better serve the CMs throughput ability. After step 118 is performed, step 116 is performed to send a downstream command to the CM to cause it to move to the higher throughput upstream. Establishment of the new upstream or finding a suitable higher througput existing upstream and moving the CM to the higher throughput upstream creates a new logical subgrouping within the grouping by modem modulation profile/DOCSIS type. Then step 120 is performed to read the throughput ability factors for the next CM, and processing vectors back to test 112.

If test 112 determines that the CM being processed is underperforming, processing vectors to step 122. There, the CMTS determines if a lower throughput upstream already exists with a suitable burst profile (for example QPSK and R-S error correction used on lower throughput channels) for the underperforming CM and which is linked to the downstream to which the CM is tuned. If such an upstream already exists, step 124 is performed to send a downstream command to the CM to cause it to move to the lower throughput upstream located in step 122. If such an upstream does not already exist, step 126 is performed to create it. Following both steps 126 and 124, step 120 is performed to read the througput ability factors for the next CM, and then processing vectors back to step 112 to determine if the next CM is over or under performing. This process continues until every CM in every logical group by type/modulation profile has been processed. In some species, the process of monitoring all CMs in all logical groups is repeated periodically, and in other species, it is only done once.

Figure 4:
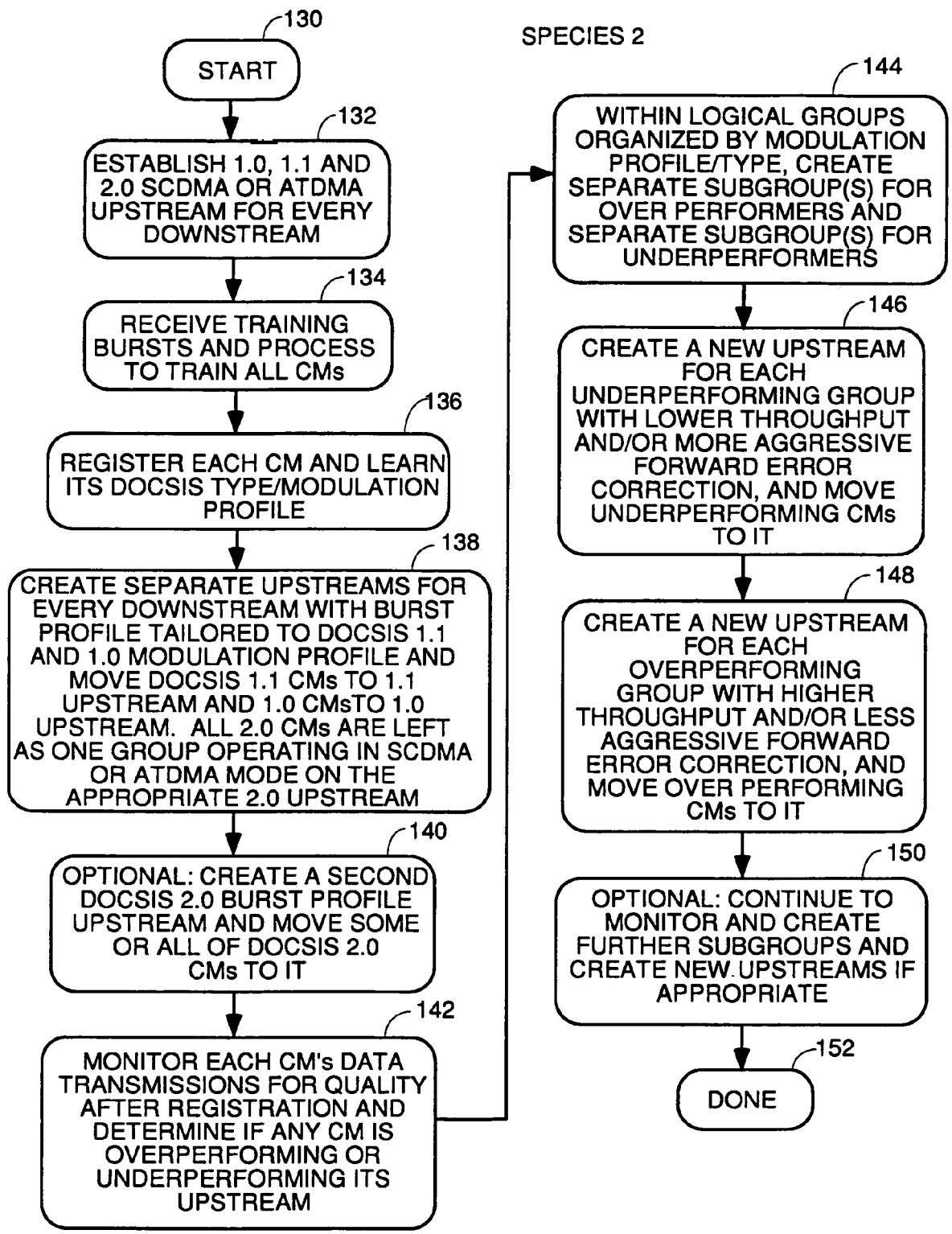
FIG. 4 is a flowchart of the process of species 2 of the invention wherein DOCSIS 1.1 and 1.0 modems are separated and all 2.0 modems are left as one group. Post registration monitoring for overperformance or underperformance is used to create new subgroups within each group.

Species 2: FIG. 4

FIG. 4 is a flowchart of a process to group CMs by modulation profile/type and break 1.0 and 1.1 modems into separate logical groups, each with their own upstream, and group all 2.0 CMs together in one logical group. Then monitoring of transmission quality is done, and subrouping within each logical group based upon overperformance or underperformance is done. The process starts at step 130 and then step 132 is performed where the CMTS establishes a 1.0 and 1.1 and 2.0 ATDMA or SCDMA upstream for every downstream. In step 134, initial training bursts are received from each CM and are processed to train each CM. Optionally, in some species, monitoring for low SNR or inadequate received power during initial ranging can be performed and low power upstreams can be established for CMs that have a power shortfall problem or low SNR.

In step 136, the CMTS conducts registration communications with each CM and learns its DOCSIS type/modulation profile and, if not already known, the upstream and downstream the CM is tuned to. In step 138, the CMTS creates separate upstreams per modem type for each downstream, the new upstreams having burst profiles tailored for DOCSIS 1.1 CM and 1.0 CM throughput ability. Downstream messages are then sent to move all DOCSIS 1.1 CMs on each downstream to the new 1.1 upstream and to move all DOCSIS 1.0 CMs to the new 1.0 upstream. All DOCSIS 2.0 CMs are left in one logical group operating on the upstream(s) created in step 132 with burst profiles tailored for 2.0 SCDMA or ATDMA operation.

An optional step 140 is performed in some subspecies of this species to create a separate upstream for each downstream. The burst profile of this new 2.0 upstream will be tailored for DOCSIS 2.0 ATDMA operation or the first 2.0 upstream is SCDMA and will be SCDMA if the first 2.0 upstream is ATDMA. Then some or all of the 2.0 CMs are moved to this upstream(s) and ordered to operate in the appropriate mode.

In step 142, each CM's data transmissions post registration are monitored for one or more throughput ability factors previously named to determine if any CM is overperforming or underperforming its upstream. Step 144 represents the process of creating one or more separate logical groups within each existing logical group for overperformers and underperformers. That is, overperformers may have one or more subgroups and upstream channels created for them with appropriate burst profiles, and underperformers may have one or more subgroups and upstream channels created for them with appropriate burst profiles.

In step 146, a new upstream is created for each underperforming subgroup within an existing logical group. The new upstream has lower throughput, less complex modulation, and/or more aggressive forward error correction burst profile parameters to allow more reliable communications with the CMs in the underperforming group. Once these new upstreams are formed, messages are sent to each underperformer moving it to the appropriate new upstream.

In step 148, a new upstream is created for each overperforming subgroup within an existing logical group. The new upstream has higher throughput and/or less aggressive forward error correction burst profile parameters to allow more reliable communications with the CMs (and consume less overhead) in the underperforming group. Once these new upstreams are formed, messages are sent to each overperforming CM moving it to the appropriate new upstream.

Step 150 is optional and defines subspecies within this species to continually monitor the performance of each CM in each group and subgroup and do further subgrouping based upon performance if appropriate. Step 152 marks the end of this process.

Figure 5:
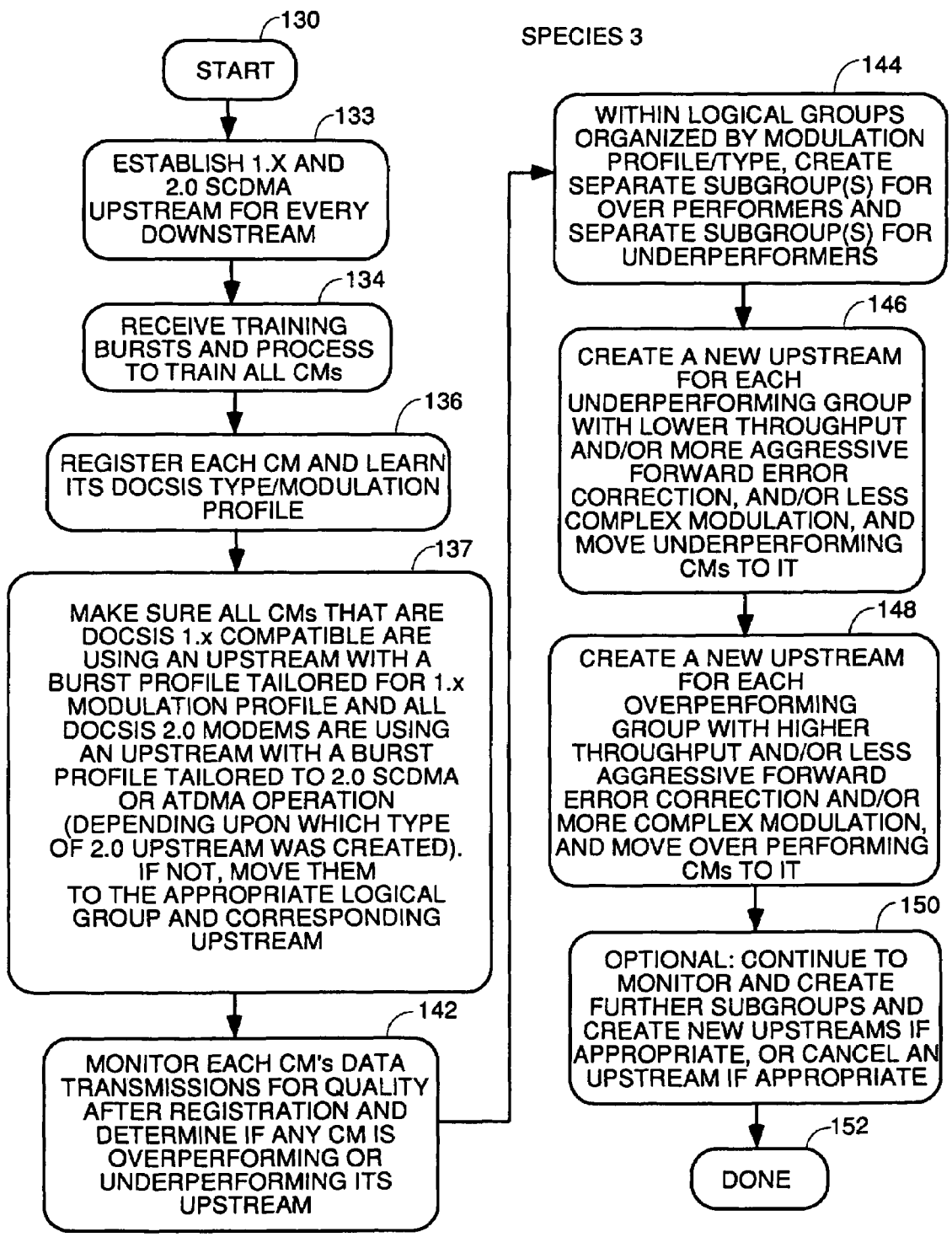
FIG. 5 is a flowchart of the process of species 3 of the invention wherein DOCSIS 1.1 and 1.0 modems are grouped in one group with a 1.x burst profile logical channel, and all 2.0 modems are left as one group. Post registration monitoring for overperformance or underperformance is used to create new subgroups within each group.

Species 3: FIG. 5

Species 3 is similar to species 2 except that all DOCSIS 1.0 and 1.1 CMs are grouped in the same 1.X logical group and all DOCSIS 2.0 CMs are grouped in the same logical group operating on an upstream created with a burst profiled tailored for SCDMA operation. The invention comes with monitoring post registration data communications for throughput ability parameters such as BER, PER, received signal power, SNR, etc. to determine if any CMs are overperforming or underperforming.

The process is the same as species 2 for steps 130, 134 and 136 to get all CMs registered. However, in step 133, only a 1.x upstream for all the 1.0 and 1.x CMs is created for each downstream group. Also in step 133, a 2.0 ATDMA or SCDMA upstream is created for each downstream group. Then step 137 is performed to make sure that all DOCSIS 1.x compatible CMs have selected an upstream that has a burst profile tailored for the DOCSIS 1.0 modulation profile. Step 137 also makes sure all DOCSIS 2.0 compatible CMs have selected an upstream that has a burst profile that is tailored to DOCSIS 2.0 SCDMA operation. The chances of this not happening are minimal since every CM locks onto a downstream and then picks the upstream associated with that downstream which is most compatible with the CM's capabilities. Therefore, step 137 is eliminated in some species.

Next, step 142 is performed to monitor each CM's post registration data transmissions for quality as indicated by the value(s) of one or more throughput ability factors previously identified. Thereafter, steps 144, 146, 148 are performed as previously described for species 2. In step 144, one or more subgroups is created for the overperformers and one or more subgroups is created for the underperformers. In step 146, a new upstream channel with an appropriate burst profile is created for each new underperforming subgroup created in step 144 and a new upstream channel with an appropriate burst profile is created for each new overperforming subgroup created in step 144. Optional step 150 can also be performed in species where continual monitoring and further subgrouping or cancellation of upstreams and regrouping of CMs is performed based upon changing conditions.

Logical Channels Based Upon Cable Nodes

Usually an upstream receiver is coupled to more than one upstream through multiple cable nodes. In the prior art, combiners have been used to combine the upstreams from cables from different cable nodes onto a single cable coupled to the upstream receiver. This has the unfortunate effect of summing the noise on all the input cables and outputting the summed noise on the single cable. This reduces the throughput of all CMs coupled to all the input cables.

The invention solves this problem by creating a separate logical upstream channel for the CMs of each cable node. The upstream for each cable node will have a burst profile based upon the SNR that the cable node has without the additional noise from other cable nodes. Each cable node is connected via a switch with the switch being activated only when a burst is expected from the cable node. The switch is switched during the gap between bursts. The gap between bursts can be the guard time that available at the end of a TDMA burst or a quiet time that is allocated by the CMTS via a null SID.

Figure 6:
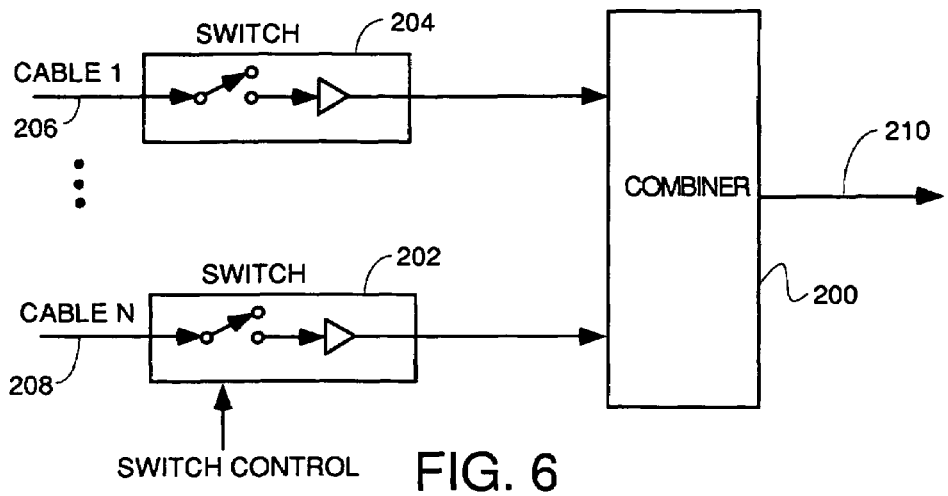
FIG. 6 represents the modified circuitry of a CMTS which uses switches controlled by the CMTS to eliminate the aggregated noise of the combiner.
Figure 7A:
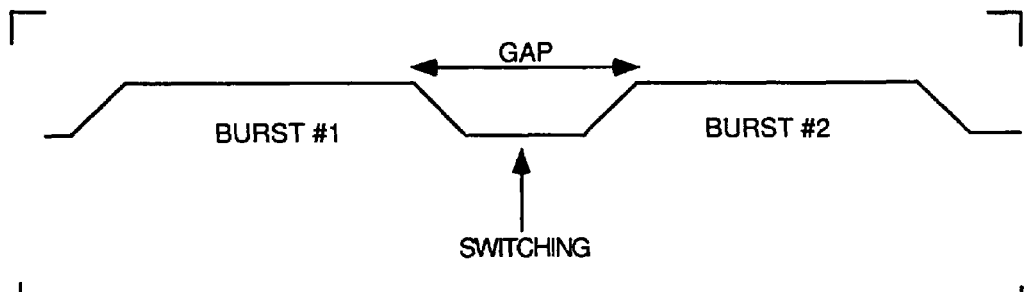
FIGS. 7A and 7B show timing diagrams for switching in TDMA and SCDMA logical channels, respectively, to avoid noise aggregation.

FIG. 6 represents the modified circuitry of a CMTS which uses switches controlled by the CMTS to eliminate the aggregated noise of the combiner. A combiner 200 in the CMTS is coupled to switches 202 and 204 on the CMTS upstream line cards that receive signals in DOCSIS upstreams transmitted on cables 206 and 208 from two cable nodes (not shown). FIG. 7A is a timing diagram of the timing of control of switches 202 and 204 in FIG. 6 for TDMA mode bursts so as to eliminate the effect of the combiner. The CMTS control logic controls switches 202 and 204 such that switch 202 is closed during the gap just before a TDMA burst on an upstream on cable 208 is expected and opened again during the gap just after the burst. Switch 204 is left open so that only the burst on cable 208 is gated through to the combiner 200. Likewise, when a TDMA burst is expected on an upstream on cable 206, switch 204 is closed during the gap just before the expected burst and opened again during the gap just after the burst. Switch 202 is left open so that only the burst on cable 206 is gated through to the combiner. This eliminates the aggregation of noise from cables 206 and 208 onto output cable 210. The CMTS controls when each CM may transmit by grants on the MAP messages of each upstream, so it knows when to expect a burst on each upstream to which it is connected.

Figure 7B:
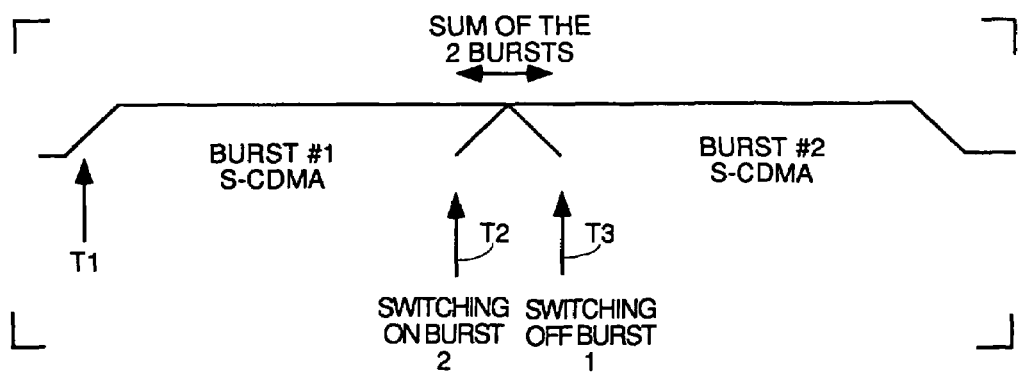

Cable nodes that have logical channels of SCDMA do not require a gap between bursts for switching cable nodes because the SCDMA spreader on bursts in different cable nodes are synchronized in time to each other, and there is no interference between bursts. The gap between SCDMA bursts has zero duration. Therefore, the switches must be operated during the ramp up and ramp down portions of SCDMA bursts since there is no gap between bursts. In order to process the ramp up and ramp down of the bursts from the two cable nodes, the switches 202 and 204 of the two cable nodes should be enabled during the ramp up and ramp down of the expected SCDMA bursts as shown in FIG. 7B. If SCDMA burst #1 is received on cable 208, switch 202 is closed at time T1 during the ramp up of burst 1, and switch 204 is left open. Burst 2 is expected to ramp up at time T2, so switch 204 is closed at that time, but switch 202 is still closed until the ramp down of burst #1 at time T3. Since the ramp up and ramp down overlap duration is small, the effect of the increased noise caused by the summation of the two cable nodes is small.

If the CMTS is a single channel receiver that can only handle one burst at a time, it will coordinate the MAP messages so that there is never an overlap in time of TDMA bursts even though the different upstreams are independent of each other. If the CMTS is a multiple channel receiver that can process more than one burst simultaneously, and overlapping bursts can happen in the MAPs, each line card will have a buffer (not shown) therein to store any overlapping burst for a time long enough that another burst can be gated through to the combiner, and then the switch on the line card with the buffered burst will be closed and the buffered burst sent through to the combiner with all other switches in an open state.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

The invention claimed is:

1. A process for optimizing transmission speeds on a distributed transmission system which can support multiple upstream channels or logical channels simultaneously, comprising:
   1) gathering data about each cable modem (CM) in a group of CMs coupled to a cable modem termination system (CMTS) through a distributed transmission system;
   2) dividing said group of CMs up into logical groups based upon CM type and/or throughput ability;
   3) creating an upstream channel or logical channel on said distributed transmission system for each logical group of CMs, each upstream channel or logical channel having transmission characteristics optimized for a particular logical group of CMs;
   4) assigning the CMs in each logical group to the upstream channel or logical channel created for that logical group; and
   5) monitoring the error rate of transmissions from each CM, and if the error rate of any CM becomes higher than an underperformance limit or lower than an overperformance limit, sending a message to said CM whose error rate has become too high or too low causing each said CM which is overperforming or underperforming to switch to an upstream channel with a burst profile which is compatible with the CM type and suitable for more efficient communications of digital data between said CMTS and said CM,
   wherein step 1 comprises gathering data about each modem through an initial ranging process and a registration process,
   and wherein step 2 comprises dividing CMs into logical groups by CM type as learned from said registration process with DOCSIS 1.0 modems in one logical group and DOCSIS 1.1 CMs in another logical group and DOCSIS 2.0 CMs in a third logical group operating in SCDMA mode only or ATDMA mode only.

2. The method of claim 1, wherein the error rate is bit error rate.

3. The method of claim 1, wherein the error rate is byte error rate.

4. The method of claim 1, wherein the error rate is packet error rate.

5. An apparatus comprising:
   a cable modem termination system (CMTS) configured to optimize transmission speeds on a distributed transmission system which can support multiple upstream channels or logical channels simultaneously, the CMTS implementing a process comprising:

1) gathering data about each cable modem (CM) in a group of CMs coupled to a cable modem termination system (CMTS) through a distributed transmission system;
2) dividing said group of CMs up into logical groups based upon CM type and/or throughput ability;
3) creating an upstream channel or logical channel on said distributed transmission system for each logical group of CMs each upstream channel or logical channel having transmission characteristics optimized for a particular logical group of CMs;
4) assigning the CMs in each logical group to the upstream channel or logical channel created for that logical group; and
5) monitoring the error rate of transmissions from each CM, and if the error rate of any CM becomes higher than an underperformance limit or lower than an overperformance limit, sending a message to said CM whose error rate has become too high or too low causing each said CM which is overperforming or underperforming to switch to an upstream channel with a burst profile which is compatible with the CM type and suitable for more efficient communications of digital data between said CMTS and said CM wherein step 1 comprises gathering data about each CM through an initial ranging process and a registration process, and wherein step 2 comprises dividing CMs into logical groups by CM type as learned from said registration process with DOCSIS 1.0 CMs in one logical group and DOCSIS 1.1 CMs in another logical group and DOCSIS 2.0 CMs in a third logical group operating in SCDMA mode only or ATDMA mode only.

6. The CMTS of claim 5, wherein the error rate is bit error rate.

7. The CMTS of claim 5, wherein the error rate is byte error rate.

8. The CMTS of claim 5, wherein the error rate is packet error rate.

* * * * *